(12) United States Patent
Chen

(10) Patent No.: US 11,087,215 B1
(45) Date of Patent: Aug. 10, 2021

(54) MACHINE LEARNING CLASSIFICATION SYSTEM

(71) Applicant: SAS Institute Inc., Cary, NC (US)

(72) Inventor: Xu Chen, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/224,708

(22) Filed: Apr. 7, 2021

Related U.S. Application Data

(60) Provisional application No. 63/060,649, filed on Aug. 3, 2020, provisional application No. 63/056,877, filed on Jul. 27, 2020, provisional application No. 63/056,595, filed on Jul. 25, 2020.

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01); *G06N 3/0472* (2013.01)

(58) Field of Classification Search
CPC ....... G06N 3/08; G06N 3/0454; G06N 3/0472
See application file for complete search history.

(56) References Cited

U.S. PATENT DOCUMENTS

| | | | |
|---|---|---|---|
| 10,783,438 B2* | 9/2020 | Kim | G06N 3/04 |
| 10,929,762 B1 | 2/2021 | Chen et al. | |
| 11,003,995 B2* | 5/2021 | Rezagholizadeh | G06N 3/0472 |
| 2018/0336471 A1* | 11/2018 | Rezagholizadeh | G06N 3/08 |
| 2019/0147333 A1* | 5/2019 | Kallur Palli Kumar | G06N 3/088 706/25 |

OTHER PUBLICATIONS

Hu et al., "Generative Adversarial Networks Based Data Augmentation for Noise Robust Speech Recognition", 2018, ICASSP 2018, pp. 5044-5048. (Year: 2018).*

Qi et al., "KE-GAN: Knowledge Embedded Generative Adversarial Networks for Semi-Supervised Scene Parsing", 2019, 2019 IEEE/CVF Conference on Computer Vision and Pattern Recognition (CVPR), pp. 5232-5241. (Year: 2019).*

(Continued)

*Primary Examiner* — Kamran Afshar
*Assistant Examiner* — Ying Yu Chen
(74) *Attorney, Agent, or Firm* — Bell & Manning, LLC

(57) ABSTRACT

A computing device classifies unclassified observations. A first batch of noise observations is generated. (A) A first batch of unclassified observations is selected. (B) A first batch of classified observations is selected. (C) A discriminator neural network model trained to classify unclassified observations and noise observations is updated with observations that include the first batch of unclassified observations, the first batch of classified observations, and the first batch of noise observations. (D) A discriminator loss value is computed that includes an adversarial loss term computed using a predefined transition matrix. (E) A second batch of unclassified observations is selected. (F) A second batch of noise observations is generated. (G) A generator neural network model trained to generate a fake observation vector for the second batch of noise observations is updated with the second batch of unclassified observations and the second batch of noise observations. (H) (A) to (G) is repeated.

30 Claims, 10 Drawing Sheets

(56) References Cited

OTHER PUBLICATIONS

Zheng et al., "Semi-Supervised SAR ATR via Multi-Discriminator Generative Adversarial Network", Sep. 1, 2019, IEEE Sensors Journal, vol. 19, No. 17, pp. 7525-7533. (Year: 2019).*
https://livebook.manning.com/book/gans-in-action/chapter-8/1, GANs in Action: Deep Learning with Generative Adversarial Networks, Chapter 8.12020.
Sukhbaatar et al., "Training Convolutional Networks with Noisy Labels," arXiv:1406.2080v2 [cs.CV] Dec. 20, 2014, 11 pages.
Radford et al., "Unsupervised Representation Learning with Deep Convolutional Generative Adversarial Networks," arXiv:1511.06434v2 [cs.LG] Jan. 7, 2016, 16 pages.
August Odena, "Semi-Supervised Learning with Generative Adversarial Networks," arXiv:1606.01583v2 [stat.ML] Oct. 22, 2016.
Sallmans et al., "Improved Techniques for Training GANs," arXiv:1606.03498vv1 [cs.LG] Jun. 10, 2016.
Zhao et al., Energy-Based Generative Adversarial Networks, published as a conference paper at ICLR 2017, arXiv:1609.03126v4 [cs.LG] Mar. 6, 2017.
Ian Goodfellow, "NIPS 2016 Tutorial: Generative Adversarial Networks," arXiv:1701.00160v4 [cs.LG] Apr. 3, 2017, 57 pages.
Goodfellow et al., Generative Adversarial Nets, arXiv:1406.2661 [stat.ML], Jun. 10, 2014, 9 pages.
Sumit Saha, A Comprehensive Guide to Convolutional Neural Networks—the EL15 way, Dec. 14, 2018; https://towardsdatascience.com/a-comprehensive-guide-to-convolutional-neural-networks-the-eli5-way-3bd2b1164a53, 12 pages.
Deep Convolutional Generative Adversarial Network, TensorFlow Core, https://www.tensorflow.org/tutorials/generative/dcgan, printed 3/10/20221.
Wikipedia, Generative adversarial network, retrieved from https://en.widipedia.org/w/index.php?title=Generative-adversarial-network&oldid=979753677, edited Sep. 22, 2020.
Jason Brownlee, "How to Develop a Bidirectional LSTM for Sequence Classification in Python with Keras," Jun. 16, 2017, in Long Short-Term Memory Networks, 54 pages, Machine Learning Mastery, last updated Jan. 18, 2021.
Kaneko et al., "Label-Noise Robust Generative Adversarial Networks," pp. 2467-2476, arXiv:1811.11165 [cs.CV], accepted to CVPR 2019.
Patrini et al., Making Deep Neural Networks Robust to Label Noise: a Loss Correction Approach, [stat.ML], Sep. 2016, oral paper at CVPR 2017.
Thalles Silva, Semi-supervised learning with Generative Adversarial Networks (GANs), Towards Data Science, Dec. 27, 2017.

\* cited by examiner

MACHINE LEARNING CLASSIFICATION SYSTEM

CROSS-REFERENCE TO RELATED APPLICATIONS

The present application claims the benefit of and priority under 35 U.S.C. § 119(e) to U.S. Provisional Patent Application No. 63/060,649 filed on Aug. 3, 2020, to U.S. Provisional Patent Application No. 63/056,877 filed on Jul. 27, 2020, and to U.S. Provisional Patent Application No. 63/056,595 filed on Jul. 25, 2020, the entire contents of which are hereby incorporated by reference.

BACKGROUND

Machine learning defines models that can be used to predict occurrence of an event, for example, from sensor or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be labeled to indicate occurrence or non-occurrence of the event or to recognize/classify the object. An unsupervised learning system predicts the label, target variable y, by defining a model that describes the hidden structure in the training data. Supervised learning requires that the target (dependent) variable y be labeled so that a model can be built to predict the label of new unlabeled data. A supervised learning system discards observations in training data that are not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data to classify the unlabeled training data in the training dataset.

Generative adversarial networks (GANs) are a machine learning framework that learns a generative distribution via adversarial training. Semi-supervised GAN is capable of discriminating a real image from fake images and generating fake images from real images, and also enables classification tasks by formulating fake images as an additional class.

Semi-supervised learning systems have many application areas such as image analysis tasks and microarray gene expression classification where measurements require expensive machinery and labels take significant time-consuming analysis and human effort. Due to the subjective nature of manual classification, human fatigue, and the difficulty of the classification task, class labels obtained from various sources such as crowdsourcing, synthetic labeling, and data programming inevitably contain noise. However, traditional semi-supervised GAN is not designed for noise reduction. As a result, the performance is reduced dramatically when the class labels are inaccurate.

SUMMARY

In an example embodiment, a non-transitory computer-readable medium is provided having stored thereon computer-readable instructions that, when executed by a computing device, cause the computing device to predict occurrence of an event or to classify an object using semi-supervised data to label unclassified data. A first batch of noise observation vectors is generated using a predefined noise function. The first batch of noise observation vectors includes a predefined number of observation vectors. (A) A first batch of unclassified observation vectors is selected from a plurality of unclassified observation vectors. The first batch of unclassified observation vectors includes the predefined number of observation vectors. (B) A first batch of classified observation vectors is selected from a plurality of classified observation vectors. A target variable value is defined to represent a class for each respective observation vector of the plurality of classified observation vectors. The first batch of classified observation vectors includes the predefined number of observation vectors. (C) A discriminator neural network model is updated with a plurality of observation vectors. The plurality of observation vectors includes the first batch of unclassified observation vectors, the first batch of classified observation vectors, and the first batch of noise observation vectors. The discriminator neural network model is trained to classify the plurality of unclassified observation vectors and the first batch of noise observation vectors. (D) A discriminator loss value is computed that includes an adversarial loss term computed using a predefined transition matrix. (E) A second batch of unclassified observation vectors is selected from the plurality of unclassified observation vectors. The second batch of unclassified observation vectors includes the predefined number of observation vectors. (F) A second batch of noise observation vectors is generated using the predefined noise function. The second batch of noise observation vectors includes the predefined number of observation vectors. (G) A generator neural network model is updated with a second plurality of observation vectors. The second plurality of observation vectors includes the second batch of unclassified observation vectors and the second batch of noise observation vectors. The generator neural network model is trained to generate a fake observation vector for each observation vector included in the second batch of noise observation vectors. (H) (E) to (G) is repeated a predetermined number of times. (I) A generator loss value is computed. (J) (A) to (I) is repeated until a convergence parameter value indicates the computed discriminator loss value and the computed generator loss value have converged or a predetermined maximum number of iterations of (A) is performed. The first batch of noise observation vectors is replaced with the fake observation vector generated for each observation vector included in the second batch of noise observation vectors in (G). The target variable value for each observation vector of the plurality of unclassified observation vectors is determined based on an output of the updated discriminator model. The target variable value is output for each observation vector of the plurality of unclassified observation vectors. The target variable value selected for each observation vector of the plurality of unclassified observation vectors identifies the class of a respective observation vector.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to predict occurrence of an event or classify an object using semi-supervised data to label unclassified data.

In an example embodiment, a method of predicting occurrence of an event or classifying an object using semi-supervised data to label unclassified data is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A classification application 122 more accurately classifies unclassified observation vectors using a relatively small number of classified observation vectors that may be noisy, which indicates that some of the human classified observation vectors have been classified incorrectly. Existing classification methods are not designed to work effectively when some of the classified observation vectors have been classified incorrectly and thus exhibit performance degradations in the presence of noisy classifications. These methods assume that the classifications provided as input are correct as a basis for training the method to classify unclassified observation vectors. The incorrect classifications have various causes including poorly trained, careless, tired, or irresponsible human classifiers. In some cases, even well-trained expert human classifiers can make mistakes when classifying data. For example, a trained radiologist may miss a cancer indicator that is present in an image thus incorrectly classifying the image as non-cancerous. As another example, it is often challenging to distinguish images such as an image including a wolf versus a dog such as a German shepherd.

Classification application 122 provides a noise-robust semi-supervised learning method based on generative adversarial networks (GANs). For illustration, classification application 122 includes a denoising layer. When training the GAN, classification application 122 also provides discriminator and generator loss functions that include a pull-away term and a feature match term to widen a density gap for semi-supervised classification thereby further enhancing performance gains in the presence of noisy labels including those associated with asymmetric noise. For illustration, asymmetric noise occurs due to a higher probability of mislabeling a wolf as a dog versus mislabeling a dog as a wolf.

There are applications for classification application 122 in many areas such as process control and equipment health monitoring, image processing and classification, data segmentation, data analysis, etc. The results presented herein further demonstrate the improved accuracy in classification.

Figure 1:
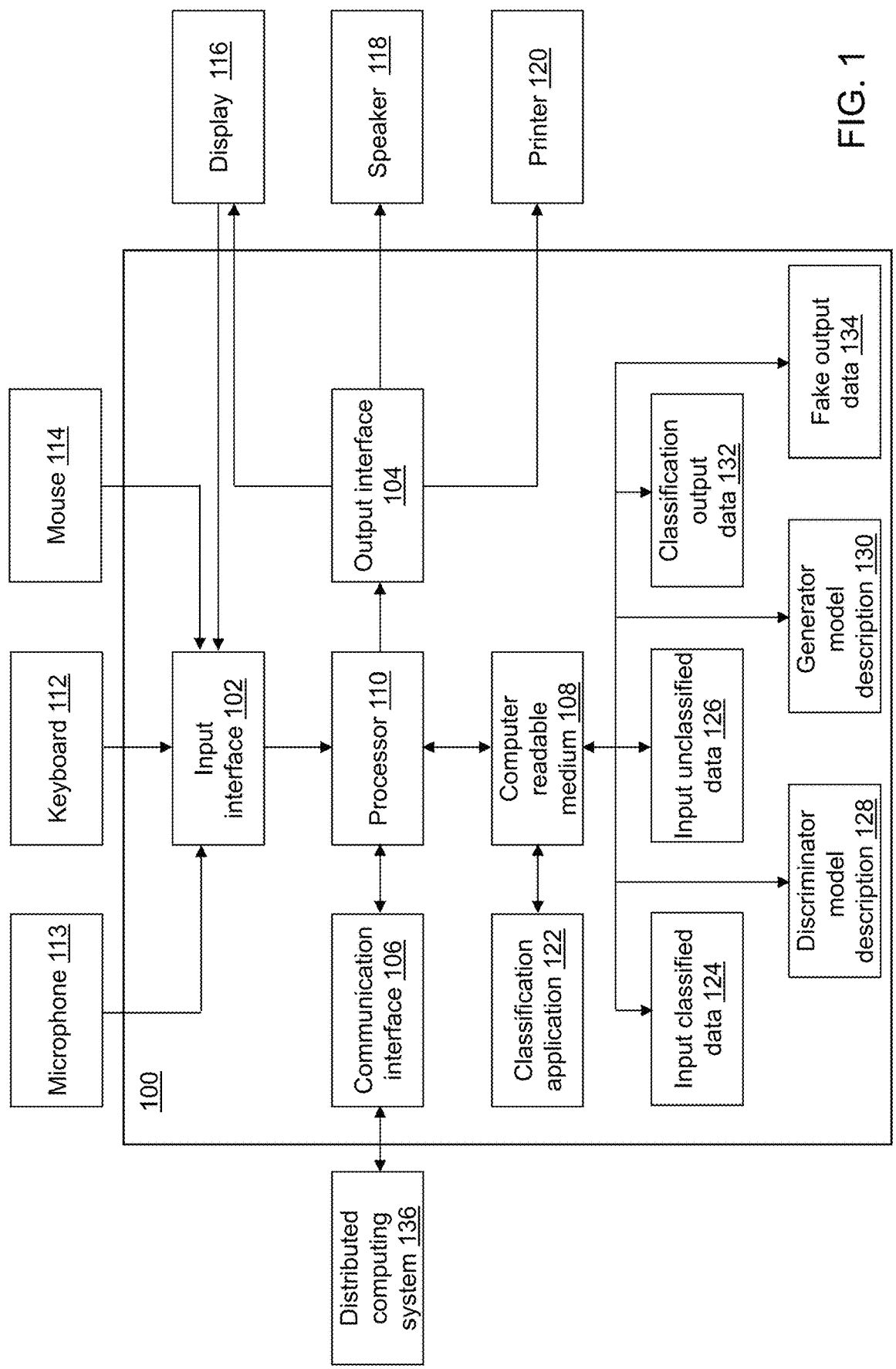
FIG. 1 depicts a block diagram of a classification device in accordance with an illustrative embodiment.

Referring to FIG. 1, a block diagram of classification device 100 is shown in accordance with an illustrative embodiment. Classification device 100 may include an input interface 102, an output interface 104, a communication interface 106, a non-transitory computer-readable medium 108, a processor 110, classification application 122, input classified data 124, input unclassified data 126, a discriminator trained model 128, a generator trained model 130, classification output data 132, and fake output data 134. Fewer, different, and/or additional components may be incorporated into classification device 100.

Input interface 102 provides an interface for receiving information from the user or another device for entry into classification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification device 100 or to make selections presented in a user interface displayed on display 116.

The same interface may support both input interface 102 and output interface 104. For example, display 116 comprising a touch screen provides a mechanism for user input and for presentation of output to the user. Classification device 100 may have one or more input interfaces that use the same or a different input interface technology. The input interface technology further may be accessible by classification device 100 through communication interface 106.

Output interface 104 provides an interface for outputting information for review by a user of classification device 100 and/or for use by another application or device. For example, output interface 104 may interface with various output technologies including, but not limited to, display 116, a speaker 118, a printer 120, etc. Classification device 100 may have one or more output interfaces that use the same or a different output interface technology. The output interface technology further may be accessible by classification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification device 100 may have one or more communication interfaces that use the same or a different communication interface technology. For example, classification device 100 may support communication using an Ethernet port, a Bluetooth antenna, a telephone jack, a USB port, etc. Data and/or messages may be transferred between classification device 100 and another computing device of a distributed computing system 136 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification device 100 also may have one or more drives that support the loading of a memory media such as a CD, DVD, an external hard drive, etc. One or more external hard drives further may be connected to classification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification application 122 performs operations associated with classifying each observation vector included in input unclassified data 126. Classification application 122 may further perform operations associated with generating fake observation vectors and/or recognizing fake images. Some or all of the operations described herein may be embodied in classification application 122. The operations may be implemented using hardware, firmware, software, or any combination of these methods.

Referring to the example embodiment of FIG. 1, classification application 122 is implemented in software (comprised of computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. As an example, classification application 122 may be part of an integrated data analytics software application and/or software architecture such as that offered by SAS Institute Inc. of Cary, N.C., USA. Merely for illustration, classification application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification application 122 may be implemented as a Web application. For example, classification application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables. In an alternative embodiment, input classified data 124 and input unclassified data 126 may be transposed. The plurality of variables define a vector $x_i$ for each observation vector i=1, 2, . . . , N, where N is a number of the observation vectors included in input classified data 124 and input unclassified data 126. Input classified data 124 includes a target variable value $y_i$ for each observation vector that indicates a label or class or other characteristic defined for the respective observation vector $x_i$ for i=1, 2, . . . , $N_c$, where $N_c$ is a number of the observation vectors included in input classified data 124. Input classified data 124 includes observation vectors that have been labeled or classified, for example, by a human or other machine learning labeling process. For example, the label or classification may indicate a class for the observation vector or otherwise indicate an identification of a characteristic of the observation vector.

For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. Input unclassified data 126 includes observation vectors $x_i$ that have not been labeled such that the $y_i$ value has not been determined though a value such as zero may be included in a column associated with the $y_i$ values. For example, input unclassified data 126 includes the respective observation vector $x_i$ for i=1, 2, . . . , $N_U$, where $N_U$ is a number of the observation vectors included in input unclassified data 126. Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefore, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 126 for analysis and processing or streamed to classification device 100 as it is generated. Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 136 and accessed by classification device 100 using communication interface 106 and/or input interface 102. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification device 100 or on distributed computing system 136. Classification device 100 may coordinate access to input classified data 124 and input unclassified data 126 that is distributed across distributed computing system 136 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™. Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
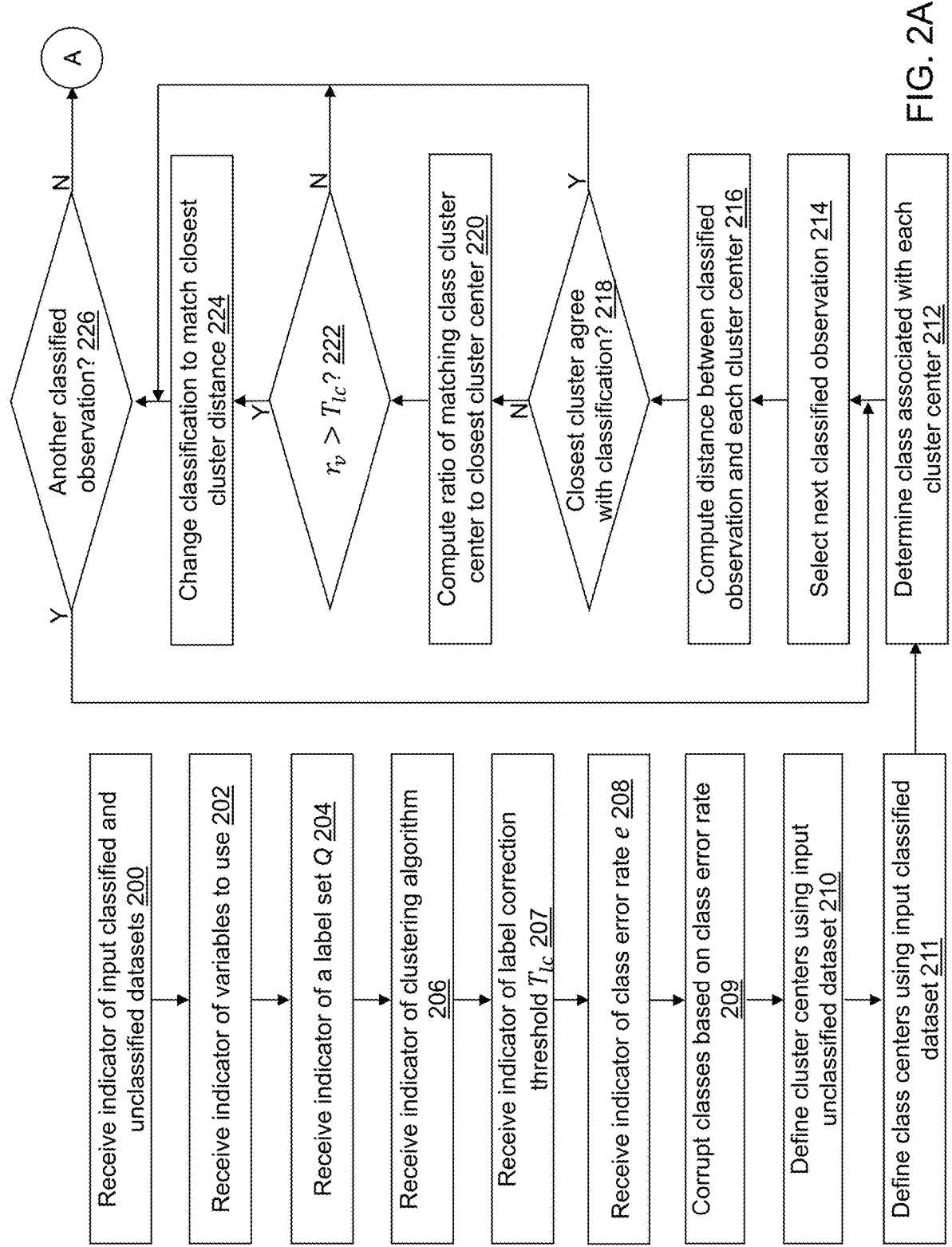
FIGS. 2A through 2C depict a flow diagram illustrating examples of operations performed by a classification application of the classification device of FIG. 1 in accordance with an illustrative embodiment.
Figure 2B:
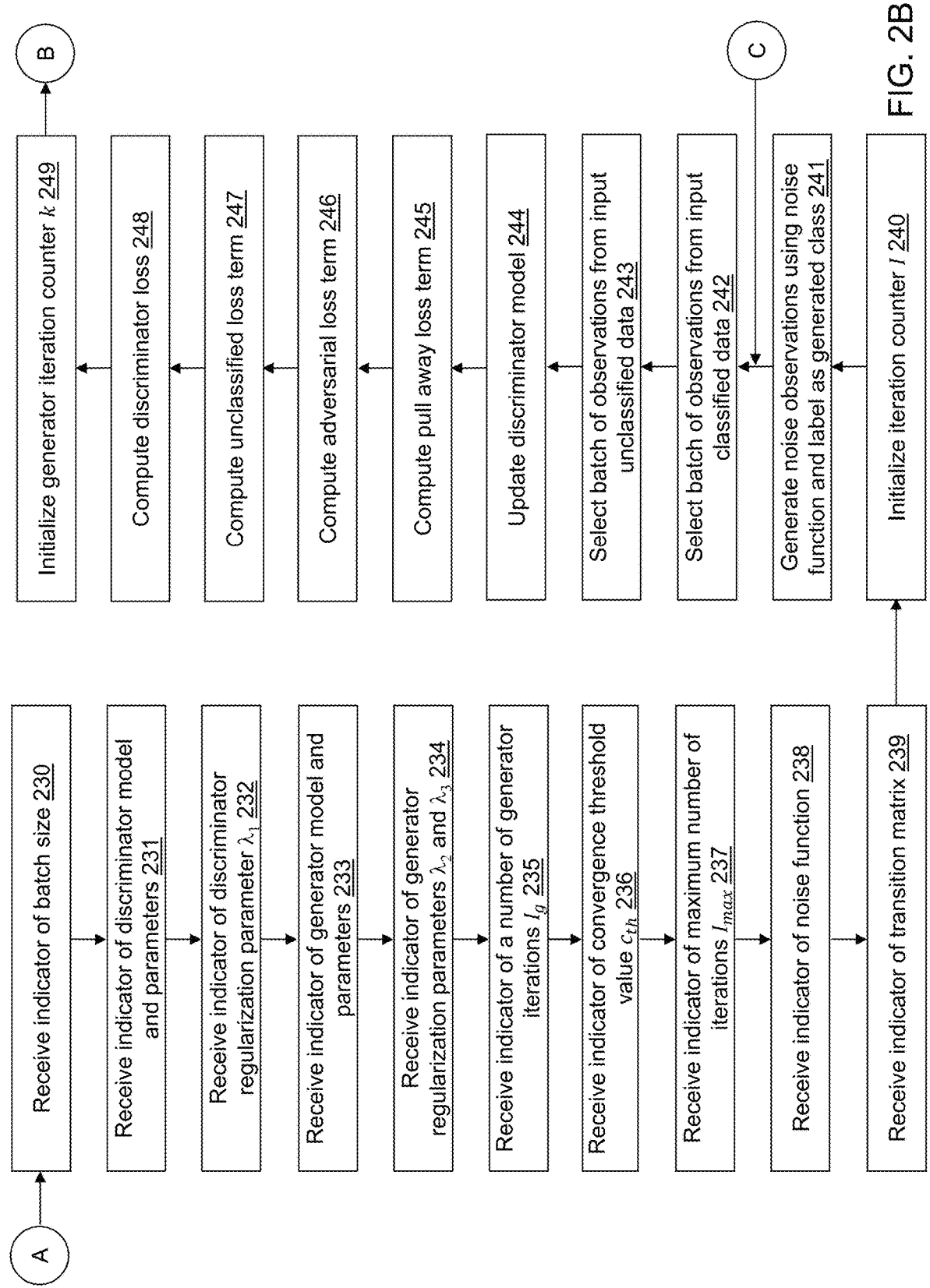
Figure 2C:
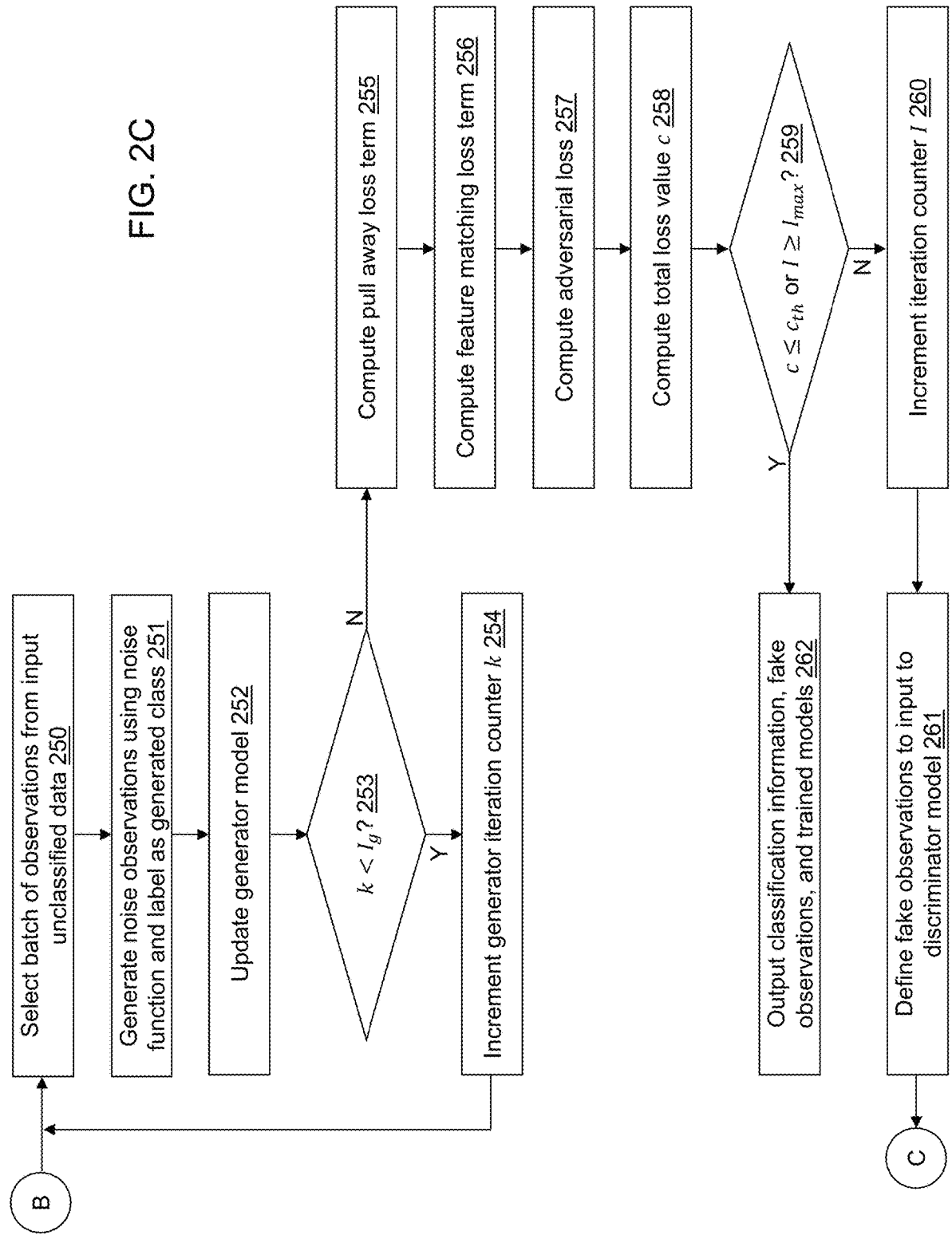

Referring to FIGS. 2A through 2C, example operations associated with classification application 122 are described. Additional, fewer, or different operations may be performed depending on the embodiment of classification application 122. The order of presentation of the operations of FIGS. 2A through 2C is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122. Some of the operational flows further may be performed in parallel, for example, using a plurality of threads and/or a plurality of computing devices such as may be included in distributed computing system 136.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification application 122 after selection from a user interface window or after entry by a user into a user interface window. In an alternative embodiment, input classified data 124 and input unclassified data 126 may not be selectable. For example, a most recently created dataset may be used automatically.

When input classified data 124 and input unclassified data 126 are stored together in memory or in a single dataset, input classified data 124 may be extracted. Input classified data 124 and input unclassified data 126 together define a point set $\chi=\{x_1, \ldots, x_{N_C}, x_{N_C+1}, \ldots, x_N\}$, where N indicates a total number of data points or observation vectors $x_i$, where the observation vectors $x_i$ ($i \leq N_C$) are labeled such that $y_i \in Q$, and the remaining observation vectors $x_i$ ($N_C < i \leq N$) are unlabeled such that $y_i \notin Q$. Thus, $N_C$ indicates a number of classified observation vectors $x_i$ included in input classified data 124. For illustration, $N_C$ may be a small percentage, such as less than 1% of the total number of observation vectors N. $N_U$ indicates the number of unclassified observation vectors.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$, where $x_i = x_{i,j}, j=1, \ldots, N_v$. $x_{i,j}$ is a j variable value for the $i^{th}$ observation vector $x_i$. A number of the plurality of variables may be indicated by $N_v$. The second indicator may further indicate a column number or a column name that stores the value for $y_i$ in input classified data 124 and/or input unclassified data 126. As another option, the first or the last column may be assumed to include the value for $y_i$.

In an operation 204, a third indicator may be received that indicates a label set Q associated with input classified data 124 and input unclassified data 126. For example, the label set Q includes a list of permissible values that the $y_i$-variable (target) value of each observation vector $x_i$ may have. For illustration, if input classified data 124 and input unclassified data 126 include text images of numeric digits, the label set Q includes c=10 permissible values that may be indicated as Q=$\{1, \ldots, c\}$, where c is a number of classes included in the label set Q, and Q=1 may be associated with the digit "0", Q=2 may be associated with the digit "1", Q=3 may be associated with the digit "2", ..., Q=10 may be associated with the digit "9". No $y_i$-variable (target) value or a variable value of zero may indicate that the associated observation vector $x_i$ is not labeled in input unclassified data 126. The label set Q further may be a binary indicator that indicates the existence or non-existence of a characteristic of each observation vector. For example, a $y_i$-variable (target) value of −1 may indicate no fraud for a transaction, a $y_i$-variable (target) value of 1 may indicate that the transaction is fraudulent, and a $y_i$-variable (target) value of 0 may indicate that the transaction has not been classified.

In an alternative embodiment, the third indicator may not be received and/or selectable. For example, the number of classes c and label set Q may be determined automatically by identifying unique values of the $y_i$-variable included in input classified data 124 and including them in label set Q where c is the number of classes included in label set Q.

In an operation 206, a fourth indicator of a clustering algorithm to execute to cluster data is received. For example, the fourth indicator indicates a name of a clustering algorithm. The fourth indicator may be received by classification application 122 after selection from a user interface window or after entry by a user into a user interface window. A default value for the clustering algorithm to execute may further be stored, for example, in computer-readable medium 108. In an alternative embodiment, the clustering algorithm may not be selectable. Example clustering algorithms include a k-means algorithm, Ward's minimum-variance algorithm, a hierarchical algorithm, a median algorithm, McQuitty's similarity analysis algorithm, or other algorithms, for example, based on minimizing a cluster residual sum of squares as understood by a person of skill in the art.

In an operation 207, a fifth indicator of a label correction threshold $T_{lc}$ may be received. In an alternative embodiment, the fifth indicator may not be received. For example, a default value may be stored, for example, in computer-readable medium 108 and used automatically. In another alternative embodiment, the value of the label correction threshold $T_{lc}$ may not be selectable. Instead, a fixed, predefined value may be used. For illustration, a default value of the label correction threshold $T_{lc}$ may be 2.0 though any value greater than or equal to two may be used. A larger value for label correction threshold $T_{lc}$ indicates greater confidence that the selected labels are going to be wrong and thus noisier.

In an operation 208, a sixth indicator of a label error rate e may be received. In an alternative embodiment, the sixth indicator may not be received. For example, a default value may be stored, for example, in computer-readable medium 108 and used automatically. In another alternative embodiment, the value of the label error rate e may not be selectable. Instead, a fixed, predefined value may be used. For illustration, a default value of the label error rate e may be 0.2 though any value greater than or equal to zero and less than one may be used.

In an operation 209, observation vectors x̃ are randomly selected from input classified data 124 based on the label error rate e. For example, if e=0.2 and there are 100 observation vectors included in input classified data 124, the observation vectors x̃ includes 20 observation vectors randomly selected from input classified data 124. The $y_i$-variable (target) value of each selected observation vector is randomly changed to any class of the number of classes c other than the $y_i$-variable (target) value associated with each respective observation vector to create corrupted observation vectors x̃. For example, if Q={1, . . . , 10}, and the $y_i$-variable (target) value is originally $y_i$=3 for an $i^{th}$ selected corrupted observation vector $\tilde{x}_i$, the $y_i$-variable (target) value is randomly changed to one of 1, 2, 4, 5, 6, 7, 8, 9, 10 selected with equal probability.

In an operation 210, cluster centers are defined by executing the clustering algorithm indicated in operation 206 to cluster input unclassified data 126 into a number of clusters equal to c the number of classes included in label set Q. Each cluster center is defined by computing an average from each observation vector assigned to the same cluster.

In an operation 211, class centers are defined by computing an average of each observation vector of input classified data 124 grouped by class or label as defined by the $y_i$-variable (target) value of each observation vector of input classified data 124 including the corrupted observation vectors x̃. Each class center is determined by computing an average of each observation vector of input classified data 124 that has a respective class. A number of class centers is also c the number of classes in label set Q.

In an operation 212, a class is determined for each cluster center. For example, a distance is computed between each cluster center of the defined cluster centers and each class center of the class centers. The computed distances are ranked for each cluster center. A class is determined for each cluster center based on the class associated with the class center that is closest or has a minimum distance to each defined cluster center. For illustration, a Euclidean distance function may be used to compute the distances.

In an operation 214, a next classified observation vector is selected from input classified data 124. For example, on a first iteration of operation 214, a first observation vector is selected; on a second iteration of operation 214, a second observation vector is selected; etc.

In an operation 216, a distance is computed between the selected next classified observation vector and each cluster center of the defined cluster centers. For illustration, a Euclidean distance function may be used to compute the distance.

In an operation 218, a determination is made concerning whether the target variable value of the selected next classified observation vector is the unique class determined for a cluster center having a minimum computed distance value. When the target variable value of the selected next classified observation vector is the unique class determined for the cluster center having the minimum computed distance value, processing continues in an operation 226. When the target variable value of the selected next classified observation vector is not the unique class determined for the cluster center having the minimum computed distance value, processing continues in an operation 220.

In operation 220, a ratio value $r_v$ is computed between a second distance value and a first distance value, where the first distance value is the minimum computed distance value and the second distance value is the computed distance value to the cluster center having the unique class of the target variable value of the selected next classified observation vector. For example, the ratio value may be computed using $$r_v = \frac{e^{-d_1}}{\sum_{j=1}^{2} e^{-d_j}},$$

where $d_1$ is the first distance value, and $d_2$ is the second distance value. $r_v$ may define a probability that the selected next classified observation vector is actually a member of the cluster associated with the minimum computed distance value instead of the cluster associated with the cluster center having the unique class of the target variable value of the selected next classified observation vector. This is the result because the smaller the first distance value is, the larger the probability that the selected next classified observation vector belongs to a specific cluster and the associated class.

In an operation 222, a determination is made concerning whether the ratio value $r_v$ is greater than the label correction threshold $T_{lc}$ indicated in operation 208. When the ratio value is greater than the label correction threshold $T_{lc}$, processing continues in an operation 224. When the ratio value is less than or equal to the label correction threshold $T_{lc}$, processing continues in operation 226.

In operation 224, the target variable value of the selected next classified observation vector is changed to the unique class determined for the cluster center having the minimum computed distance value. Some or even all of the corrupted observation vectors x̃ may be changed back to the correct label or otherwise assigned a different class.

In operation 226, a determination is made concerning whether input classified data 124 includes another observation vector to process. When input classified data 124 includes another observation vector, processing continues in operation 214 to process the next classified observation vector to determine if it is likely in error and thus a noisy label in need of automatic correction. When input classified data 124 does not include another observation vector, processing continues in an operation 230 shown referring to FIG. 2B.

In operation 230, a seventh indicator of a batch size $n_b$ may be received. In an alternative embodiment, the seventh indicator may not be received. For example, a default value may be stored, for example, in computer-readable medium 108 and used automatically. In another alternative embodiment, the value of the batch size $n_b$ may not be selectable. Instead, a fixed, predefined value may be used. For illustration, a default value for the batch size $n_b$ value may be $n_b=4$ though other values may be used.

In an operation 231, an eighth indicator indicates an architecture of a discriminator model and its hyperparameters. For illustration, the discriminator model may be a neural network model to be trained to classify input observation vectors. The eighth indicator may be received by classification application 122 from a user interface window or after entry by a user into a user interface window. A default value for the architecture may further be stored, for example, in computer-readable medium 108. For illustration, the discriminator model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network.

For illustration, the discriminator model may be a deep-convolutional neural network that uses a convolutional layer connected to a batch normalization layer that is further connected to a rectified linear activation function (ReLU) layer that is a piecewise linear function that outputs the input directly if it is positive, and output zero otherwise. Any pooling layers are replaced with a strided convolutions layer, where a stride is a sliding step. For deeper architectures, fully connected hidden layers are removed. Leaky ReLU activation is used for all layers and allows a small positive gradient when the unit is not active. For example, F(x)=x if x>0; otherwise, F(x)=0.01x.

Figure 3:
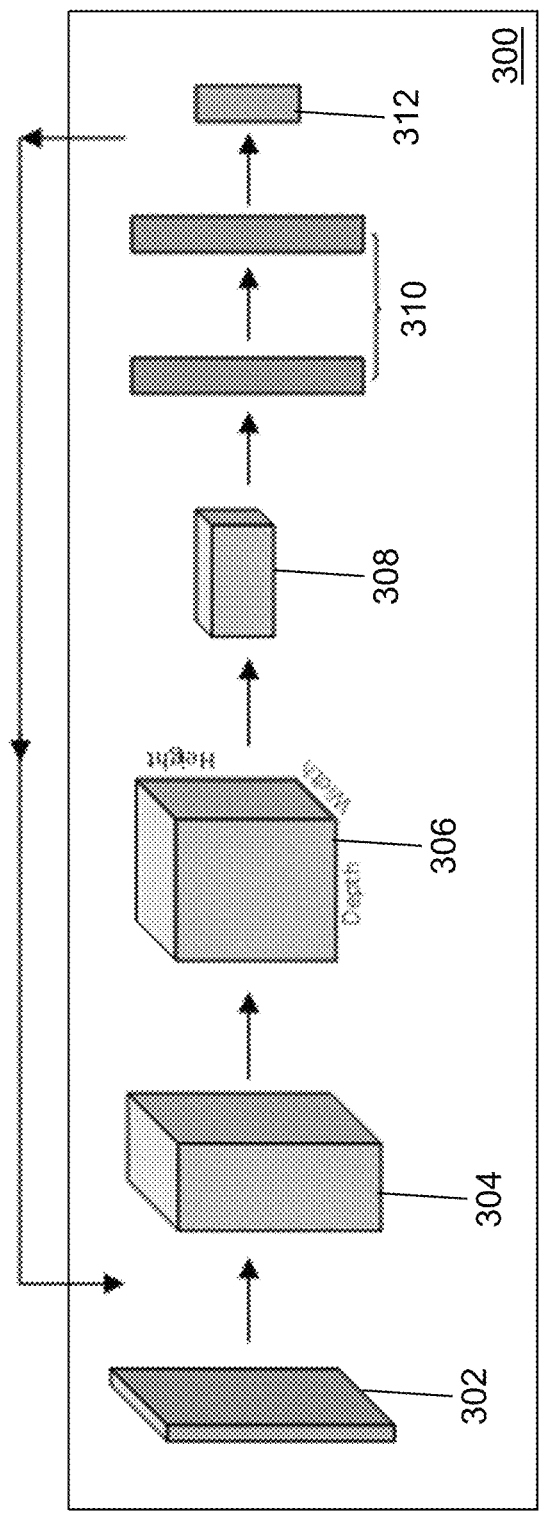
FIG. 3 depicts an illustrative neural network training process in accordance with an illustrative embodiment.

Referring to FIG. 3, an architecture 300 is shown in accordance with an illustrative embodiment. Architecture 300 includes an input layer 302 that provides input to a first convolution layer 304 that provides input to a second convolution layer 306 that provides input to a pooling layer 308 that provides input to a fully connected layer 310 that provides input to an output layer 312. A measure of an error in terms of an objective function is fed back to drive an adjustment of weights associated with each neuron of architecture 300. Gradients may be computed each iteration through back propagation through the architecture and also used to drive the adjustment of weights associated with each neuron of architecture 300.

The eighth indicator may further indicate other hyperparameters for the discriminator model as well as an initial weight vector $w_0$ or a methodology by which the initial weight vector $w_0$ is defined. The eighth indicator may further indicate training parameters for the discriminator model such as those associated with application of gradient descent in updating gradient vectors and weight vectors each iteration and in applying forward and backward propagation.

In an operation 232, a ninth indicator of a first regularization parameter value $\lambda_1$ may be received. In an alternative embodiment, the ninth indicator may not be received. For example, default values may be stored, for example, in computer-readable medium 108 and used automatically. In another alternative embodiment, the value of the first regularization parameter $\lambda_1$ may not be selectable. Instead, a fixed, predefined value may be used. For illustration, a default value of the first regularization parameter $\lambda_1$ may be 0.7 though other values may be used.

In an operation 233, a tenth indicator indicates an architecture of a generator model and its hyperparameters. For illustration, the generator model may be a neural network model to be trained to generate new observation vectors. The tenth indicator may be received by classification application 122 from a user interface window or after entry by a user into a user interface window. A default value for the architecture may further be stored, for example, in computer-readable medium 108. For illustration, the generator model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network For illustration, the generator model may be a deep-convolutional neural network that uses a convolutional layer connected to a batch normalization layer that is further connected to a ReLU layer. Any pooling layers are replaced with a fractional-strided convolutions layer that inserts zeros between input units during the convolution making the kernel move around at a slower pace than with a unit stride. For deeper architectures, fully connected hidden layers are removed. ReLU activation is used for all layers except for the output layer that uses the activation function tan h.

The tenth indicator may further indicate other hyperparameters for the generator model as well as an initial weight vector $w_0$ or a methodology by which the initial weight vector $w_0$ is defined. The tenth indicator may further indicate training parameters for the generator model such as those associated with application of gradient descent in updating gradient vectors and weight vectors each iteration and in applying forward and backward propagation.

In an operation 234, an eleventh indicator of a second regularization parameter value $\lambda_2$ and a third regularization parameter value $\lambda_3$ may be received. In an alternative embodiment, the eleventh indicator may not be received. For example, default values may be stored, for example, in computer-readable medium 108 and used automatically. In another alternative embodiment, the values of the second regularization parameter value $\lambda_2$ and the third regularization parameter value $\lambda_3$ may not be selectable. Instead, fixed, predefined values may be used. For illustration, a default value of the second regularization parameter value $\lambda_2$ may be 0.7 and a default value of the third regularization parameter value $\lambda_3$ may be 0.7 though other values may be used.

In an operation 235, a twelfth indicator of a number of generator iterations $I_g$ for each discriminator iteration may be received. In an alternative embodiment, the twelfth indicator may not be received. For example, a default value may be stored, for example, in computer-readable medium 108 and used automatically. In another alternative embodiment, the number of generator iterations $I_g$ may not be selectable. Instead, a fixed, predefined value may be used. For illustration, a default value of the number of generator iterations $I_g=10$ though other values may be used.

In an operation 236, a thirteenth indicator of a convergence threshold value $c_{th}$ may be received. In an alternative embodiment, thirteenth twelfth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used. For illustration, a default value of the convergence threshold value $c_{th}$ may be 0.01 though other values may be used.

In an operation 237, a fourteenth indicator of a maximum number of iterations $I_{max}$ may be received. In an alternative embodiment, the fourteenth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 238, a fifteenth indicator of a noise function may be received. For example, the fifteenth indicator indicates a name of a noise function. The fifteenth indicator may be received by classification application 122 after selection from a user interface window or after entry by a user into a user interface window. A default value for the noise function may further be stored, for example, in computer-readable medium 108. As an example, a noise function may be selected from "Gaussian", "Uniform", etc. For example, a default noise function may be the Gaussian function. Of course, the noise function may be labeled or selected in a variety of different manners by the user as understood by a person of skill in the art. In an alternative embodiment, the noise function may not be selectable, and a single noise function is implemented in classification application 122. For example, the Gaussian function may be used by default or without allowing a selection. With the selection of the noise function, parameters associated with the selected noise function may be provided using the fifteenth indicator. For example, when Gaussian function is used, a mean and a variance may be provided. In an illustrative embodiment, a Gaussian function with a mean value of zero and a unit value for the variance may be defined and used by default.

In an operation 239, a sixteenth indicator of a transition matrix T that has dimension cxc with the $(i,j)^{th}$ element of the matrix T representing a probability that an observation vector belongs to class i but is labeled to be class j, and c is the number of classes. For example, the probability may be estimated from past data. In an alternative embodiment, the sixteenth indicator may not be received. For example, a default value may be stored, for example, in computer-readable medium 108 and used automatically. In another alternative embodiment, the values for the transition matrix T may not be selectable. Instead, fixed, predefined values may be used.

In an operation 240, an iteration counter I is initialized, for example, as I=1.

In an operation 241, the batch size $n_b$ number of observation vectors are generated using the noise function indicated in operation 238 to define variable values for each of the number of the plurality of variables $N_v$ and for each generated observation vector z. A set of noise observation vectors $X_n$ is defined. A value for the target variable y for each generated observation vector z is defined as y=c+1.

In an operation 242, the batch size $n_b$ number of observation vectors are selected from input classified data 124 to define a set of classified observation vectors $X_C$. The observation vectors may be randomly selected from input classified data 124 with replacement in an illustrative embodiment.

In an operation 243, the batch size $n_b$ number of observation vectors are selected from input unclassified data 126 to define a set of unclassified observation vectors $X_U$. The observation vectors may be randomly selected from input unclassified data 126 with replacement in an illustrative embodiment.

In an operation 244, the discriminator model defined by the architecture specified in operation 231 is updated with $X_C$, $X_U$, and $X_n$ to compute a weight vector $w_k$ and a gradient vector $g_k$ that includes values for each neuron of the discriminator model. The discriminator model is updated by ascending its stochastic gradient to minimize a classification loss. An output of the discriminator model is a target variable value y or a class assignment to each observation vector of $X_U$ and $X_n$, where the observation vector may be assigned to a class c+1 that indicates a fake observation vector.

In each epoch, an objective function is computed based on a discriminator loss term for the discriminator model computed, for example, using $L_d = L_{pt,d} + L_{adv,d} + \lambda_1 L_{un}$, where $L_{pt,d}$ is a pull away loss term for the discriminator model, $L_{adv,d}$ is an adversarial loss term for the discriminator model, and $L_{un}$ is an unclassified loss term for the discriminator model.

In an operation 245, the pull away loss term is computed, for example, using $$L_{pt,d} = \frac{1}{n_b(n_b-1)} \sum_{i=1}^{n_b} \sum_{j=1, j\neq i}^{n_b} \frac{(h^n(x_i)^T h^n(x_j))^2}{\|h^n(x_i)^T\| \|h^n(x_j)\|},$$

n=1, . . . , $n_{cl}$, where h represents a convolution layer of the discriminator model, n is a convolution layer index, $n_{cl}$ is a number of convolution layers included in the discriminator model, $x_i$ is an $i^{th}$ observation vector of $X_C$, $X_U$, and $X_n$, $x_j$ is a $j^{th}$ observation vector of $X_C$, $X_U$, and $X_n$, $\tau$ indicates a transpose, and $\| \|$ indicates an L1 norm computation. For example, for a convolution layer, h represents the convolution operations. The pull away term is applied to avoid model collapse if the observation vectors are very similar. The cosine similarity is maximized when the angles become close to zero. The pull away term is designed to keep representations in a specific layer away from others as far as possible. An example computation using h is described in *A Comprehensive Guide to Convolutional Neural Networks— the ELI5 way* by Sumit Saha and published online on Dec. 15, 2018.

In an operation 246, the adversarial loss term for the discriminator model is computed, for example, using $L_{adv,d} = E_{(x^r, \tilde{y}) \sim p^r(x, \tilde{y})} [-\log \Sigma_{\tilde{y}^r} T_{\tilde{y}^r \tilde{y}^r} \hat{C}(\hat{y}=y^r | \hat{x}^r)]$, where T is the transition matrix indicated in operation 239, $E_{(x^r, \tilde{y}) \sim p^r(x, \tilde{y})}$ indicates an expectation computed based on a probability distribution of input classified data 124, $(x^r, \hat{y})$ indicates the observation vectors from input classified data 124 with their associated $y_i$-variable (target) value after operation 226, $(x, \tilde{y})$ indicates the observation vectors from input classified data 124 with their associated $y_i$-variable (target) value before operation 212, $p^r(x, \tilde{y})$ indicates a joint distribution of input classified data 124 including the corrupted observation vectors $\tilde{x}$, $\hat{y}^r$ indicates a corrected $y_i$-variable (target) value after operation 226, $\tilde{y}^r$ indicates the $y_i$-variable (target) value before operation 212 including the corrupted observation vectors $\tilde{x}$, $\hat{x}^r$ indicates the observation vectors from input classified data 124 for which their associated $y_i$-variable (target) value was changed in operation 224, $\hat{C}(\hat{y}=\hat{x}^r)$ indicates a conditional probability that the class $\hat{y}$ is classified as $y^r$ given the observation vector from input classified data 124. $\hat{C}(\hat{y}=y^r | \hat{x}^r)$ can be computed from the Softmax output as a ratio. $E_{(x^r, \tilde{y}) \sim p^r(x, \tilde{y})}$ is computed automatically from the discriminator model.

In an operation 247, the unclassified loss term for the discriminator model is computed, for example, using $L_{un} = -E_{x \in X_U} \log [1-P(y \leq c | x)] - E_{x \in X_n} \log P(y=c+1 | x)$ where the first term maximizes a log probability of the first c classes of each observation vector of $X_U$, and the second term maximizes a log probability of the (c+1)th class for each observation vector of $X_n$.

In an operation 248, a discriminator loss term for the discriminator model is computed, for example, using $L_d = L_{pt,d} + L_{adv,d} + \lambda_1 L_{un}$.

In an operation 249, a generator iteration counter k is initialized, for example, as k=1, and processing continue in an operation 250 shown referring to FIG. 2C.

In operation 250, the batch size $n_b$ number of observation vectors are selected from input unclassified data 126 to define a set of unclassified observation vectors $X_U$.

In an operation 251, the batch size $n_b$ number of observation vectors are generated using the noise function indicated in operation 238 to define variable values for each of the number of the plurality of variables $N_v$ and for each generated observation vector z. A set of noise observation vectors $X_n$ is defined. A value for the target variable y for each generated observation vector z is defined as y=c+1.

In an operation 252, the generator model defined by the architecture specified in operation 233 is updated with $X_U$ and $X_n$ to compute a weight vector $w_k$ and a gradient vector $g_k$ that includes values for each neuron of the generator model. The generator model is updated by descending its stochastic gradient to maximize a classification loss. An output of the generator model is a batch number $n_b$ of fake observation vectors that define an updated set $X_n$.

In an operation 253, a determination is made concerning whether the number of iterations of the generator update have been performed. When $k < I_g$, processing continues in an operation 254. When $k \geq I_g$, processing continues in an operation 255.

In operation 254, generator iteration counter k is incremented, for example, as k=k+1, and processing continue in operation 250 to update the generator model with a next batch of $X_U$ and $X_n$.

In each epoch, an objective function is computed based on a generator loss term $L_g$ for the generator model computed, for example, using $L_g = L_{fm} + \lambda_2 L_{pt,g} +$ where $L_{fm}$ is feature matching loss term for the generator model, $L_{pt,g}$ is a pull away loss term for the generator model, and $L_{adv,g}$ is an adversarial loss term for the generator model.

In operation 255, the pull away loss term for the generator model is computed, for example, using $$L_{pt,g} = \frac{1}{n_b(n_b-1)} \sum_{i=1}^{n_b} \sum_{j=1, j \neq i}^{n_b} \frac{(h^n(x_i)^T h^n(x_j))^2}{\|h^n(x_i)^T\| \|h^n(x_j)\|},$$

where h represents a layer of the generator model, n is a layer index, $x_i$ is an $i^{th}$ observation vector of $X_U$ and $X_n$, and $x_j$ is a $j^{th}$ observation vector of $X_U$ and $X_n$.

In an operation 256, the feature matching loss term for the generator model is computed, for example, using $$L_{fm} = \sum_{i=1}^{n_b} \sum_{j=1, j \neq i}^{n_b} \|E_{x_i \in X_U} h^n(x_i) - E_{x_j \in X_n} h^n(x_j)\|_2^2,$$

where $x_i$ is an $i^{th}$ observation vector of $X_U$, $x_j$ is a $j^{th}$ observation vector of $x_n$, and $\| \|_2^2$ indicates a squared Euclidean distance. The feature matching loss term minimizes a distance between the generated samples of $X_n$ and the unclassified observation vectors of $X_U$.

In an operation 257, the adversarial loss term for the generator model is computed, for example, using $L_{adv,g} = E_{z \sim p(z), \hat{y}^g \sim p(\tilde{y})} [-\log(\hat{C}(\hat{y}=y^g | G(z, \hat{y}^g)))]$, where $E_{z \sim p(z), \hat{y}^g \sim p(\tilde{y})}$ indicates an expectation computed based on a probability distribution of $X_n$, z indicates the observation vectors from $X_n$, $\hat{y}^g$ indicates the $y_i$-variable (target) value associated with observation vector z, $p(\tilde{y})$ indicates a probability of a corrupted label $\tilde{y}$, $G(z, \hat{y}^g)$ indicates a generated observation vector from random noise z and the corrected noisy label $\hat{y}^g$ associated with observation vector z, and $\hat{C}(\hat{y}=y^g(z, \hat{y}^g))$ indicates a probability that $\hat{y}$ is equal to $y^g$ given the generated image. $\hat{C}(\hat{y}=y^g | G(z, \hat{y}^g))$ can be computed from the Softmax output as a ratio. $E_{z \sim p(z), \hat{y}^g \sim p(\tilde{y})}$ is computed automatically from the discriminator model.

In an operation 258, a total loss term for the GAN is computed, for example, using $c = L_d + L_g$.

In an operation 259, a determination is made concerning whether convergence has been achieved or the maximum number of iterations have been performed. If $c \leq c_{th}$ or $I \geq I_{max}$, processing continues in an operation 262. If $c > c_{th}$ and $I < I_{max}$, processing continues in an operation 260.

In operation 260, the iteration counter I is incremented, for example, as I=I+1.

In an operation 261, the observations output from a last layer of the updated generator model, $G(z, \hat{y}^g)$, are defined as $X_n = G(z, \hat{y}^g)$, and processing continues in operation 242 to update the discriminator model with the updated $X_n$ and new batches of unclassified and classified observations.

In operation 262, the neural network model description including $w_k$ may be output for the updated discriminator model and/or the updated generator model. For example, the updated discriminator model may be output to discriminator model description 128, and the updated generator model may be output to generator model description 130. The neural network model description may include the neural network architecture. The noise function indicated in operation 238 further may be output to generator model description 130. For illustration, the trained discriminator model and/or the generator model may be stored using the ASTORE procedure provided by SAS® Visual Data Mining and Machine Learning software. The classification for each observation vector included in input unclassified data 126 may be output to classification output data 132 with or without a respective observation vector. The set $X_n$ of fake observation vectors generated by the generator model may be output to fake output data 134 with or without a classification by the updated discriminator model.

Figure 4:
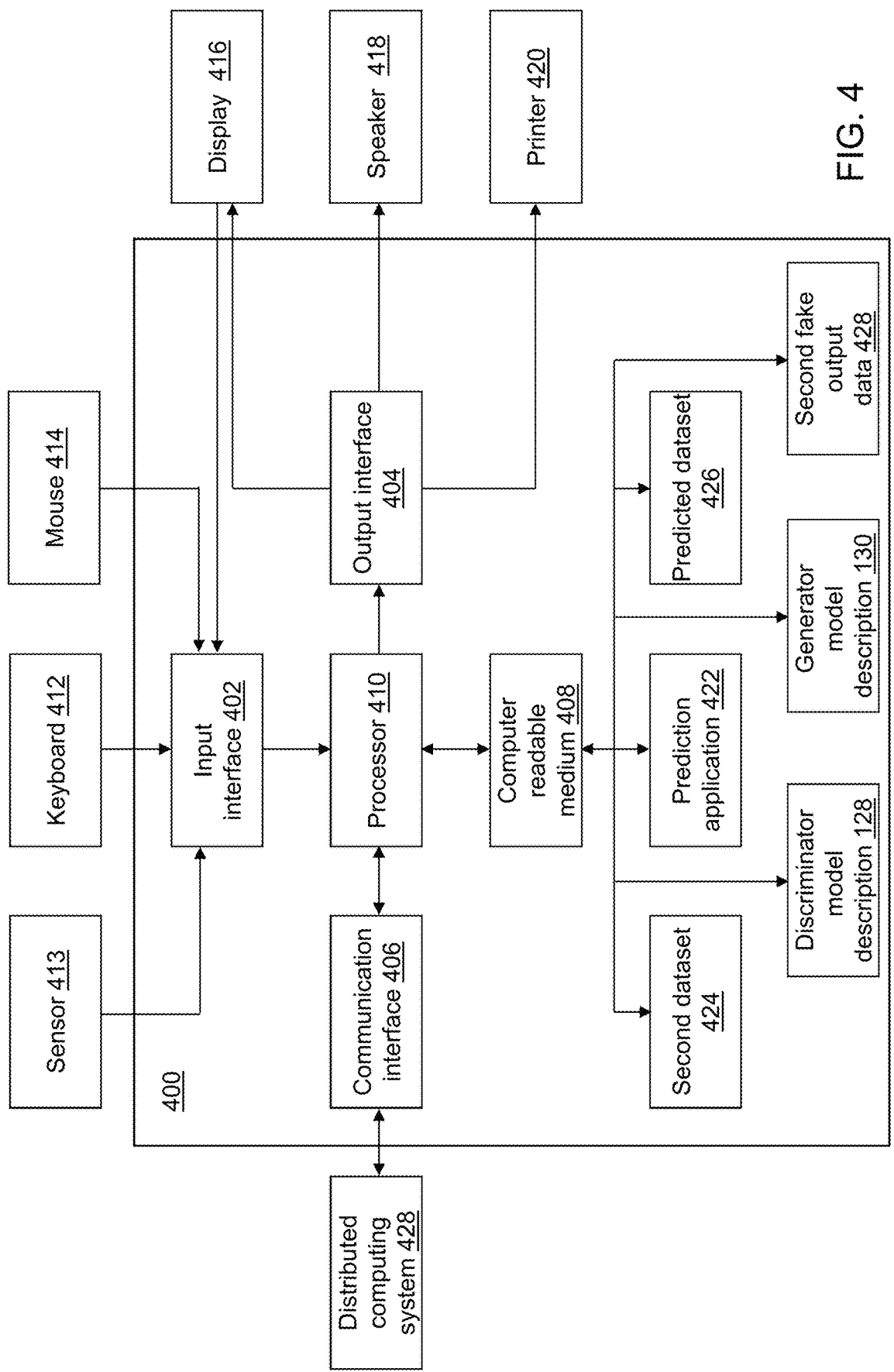
FIG. 4 depicts a block diagram of a prediction device in accordance with an illustrative embodiment.

Referring to FIG. 4, a block diagram of a prediction device 400 is shown in accordance with an illustrative embodiment. Prediction device 400 may include a second input interface 402, a second output interface 404, a second communication interface 406, a second non-transitory computer-readable medium 408, a second processor 410, a prediction application 422, second dataset 424, second fake output data 426, predicted dataset 426, discriminator model description 128, and generator model description 130. Fewer, different, and/or additional components may be incorporated into prediction device 400. Prediction device 400 and classification device 100 may be the same or different devices.

Second input interface 402 provides the same or similar functionality as that described with reference to input interface 102 of classification device 100 though referring to prediction device 400. Second output interface 404 provides the same or similar functionality as that described with reference to output interface 104 of classification device 100 though referring to prediction device 400. Second communication interface 406 provides the same or similar functionality as that described with reference to communication interface 106 of classification device 100 though referring to prediction device 400. Data and messages may be transferred between prediction device 400 and a distributed computing system 428 using second communication interface 406. Distributed computing system 136 and distributed computing system 428 may be the same or different computing systems. Second computer-readable medium 408 provides the same or similar functionality as that described with reference to computer-readable medium 108 of classification device 100 though referring to prediction device 400. Second processor 410 provides the same or similar functionality as that described with reference to processor 110 of classification device 100 though referring to prediction device 400.

Prediction application 422 performs operations associated with classifying or predicting a characteristic value related to each observation vector included in second dataset 424. The predicted characteristic value may be stored in predicted dataset 426 to support various data analysis functions as well as provide alert/messaging related to each prediction that may be a classification. Dependent on the type of data stored in input classified data 124, input unclassified data 126, and second dataset 424, prediction application 422 may identify anomalies as part of process control, for example, of a manufacturing process, for machine condition monitoring, for image classification, for intrusion detection, for fraud detection, for text recognition, for voice recognition, for language translation, etc. Some or all of the operations described herein may be embodied in prediction application 422. The operations may be implemented using hardware, firmware, software, or any combination of these methods.

Referring to the example embodiment of FIG. 4, prediction application 422 is implemented in software (comprised of computer-readable and/or computer-executable instructions) stored in second computer-readable medium 408 and accessible by second processor 410 for execution of the instructions that embody the operations of prediction application 422. Prediction application 422 may be written using one or more programming languages, assembly languages, scripting languages, etc. Prediction application 422 may be integrated with other analytic tools. As an example, prediction application 422 may be part of an integrated data analytics software application and/or software architecture such as that offered by SAS Institute Inc. of Cary, N.C., USA. For example, prediction application 422 may be part of SAS® Enterprise Miner™ developed and provided by SAS Institute Inc. of Cary, N.C., USA. Merely for further illustration, prediction application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA.

One or more operations of prediction application 422 further may be performed by an ESPE on an event stream instead of reading observation vectors from second dataset 424. Prediction application 422 and classification application 122 may be the same or different applications that are integrated in various manners to train the discriminator model and the generator model using input classified data 124 and input unclassified data 126 that may be distributed on distributed computing system 136 and to execute the trained discriminator model to predict the characteristic of each observation vector included in second dataset 424 that may be distributed on distributed computing system 428 or to execute the trained generator model to generate fake observation vectors from second dataset 424 stored in second fake output data 428.

Prediction application 422 may be implemented as a Web application. Prediction application 422 may be integrated with other system processing tools to automatically process data generated as part of operation of an enterprise, to classify data in the processed data, and/or to provide a warning or alert associated with the prediction using second input interface 402 and/or second communication interface 406 so that appropriate action can be initiated in response. For example, a warning or an alert may be presented using a second display 416, a second speaker 418, a second printer 420, etc. or sent to one or more computer-readable media, display, speaker, printer, etc. of distributed computing system 428.

Input classified data 124, input unclassified data 126, and second dataset 424 may be generated, stored, and accessed using the same or different mechanisms. The target variable is not defined in second dataset 424. Similar to input classified data 124 and input unclassified data 126, second dataset 424 may include a plurality of rows and a plurality of columns with the plurality of rows referred to as observations or records, and the columns referred to as variables that are associated with an observation. Second dataset 424 may be transposed.

Similar to input classified data 124 and input unclassified data 126, second dataset 424 may be stored on second computer-readable medium 408 or on one or more computer-readable media of distributed computing system 428 and accessed by prediction device 400 using second communication interface 406. Data stored in second dataset 424 may be a sensor measurement or a data communication value, for example, from a sensor 413, may be generated or captured in response to occurrence of an event or a transaction, generated by a device such as in response to an interaction by a user with the device, for example, from a second keyboard 412 or a second mouse 414, etc. The data stored in second dataset 424 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 424 may be captured at different time points periodically, intermittently, when an event occurs, etc. One or more columns may include a time value. Similar to input classified data 124 and input unclassified data 126, data stored in second dataset 424 may be generated as part of the IoT, and some or all data may be pre- or post-processed by an ESPE.

Similar to input classified data 124 and input unclassified data 126, second dataset 424 may be stored in various compressed formats such as a coordinate format, a compressed sparse column format, a compressed sparse row format, etc. Second dataset 424 further may be stored using various structures as known to those skilled in the art including a file system, a relational database, a system of tables, a structured query language database, etc. on prediction device 400 and/or on distributed computing system 428. Prediction device 400 may coordinate access to second dataset 424 that is distributed across a plurality of computing devices that make up distributed computing system 428. For example, second dataset 424 may be stored in a cube distributed across a grid of computers as understood by a person of skill in the art. As another example, second dataset 424 may be stored in a multi-node Hadoop® cluster. As another example, second dataset 424 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 424.

Figure 5:
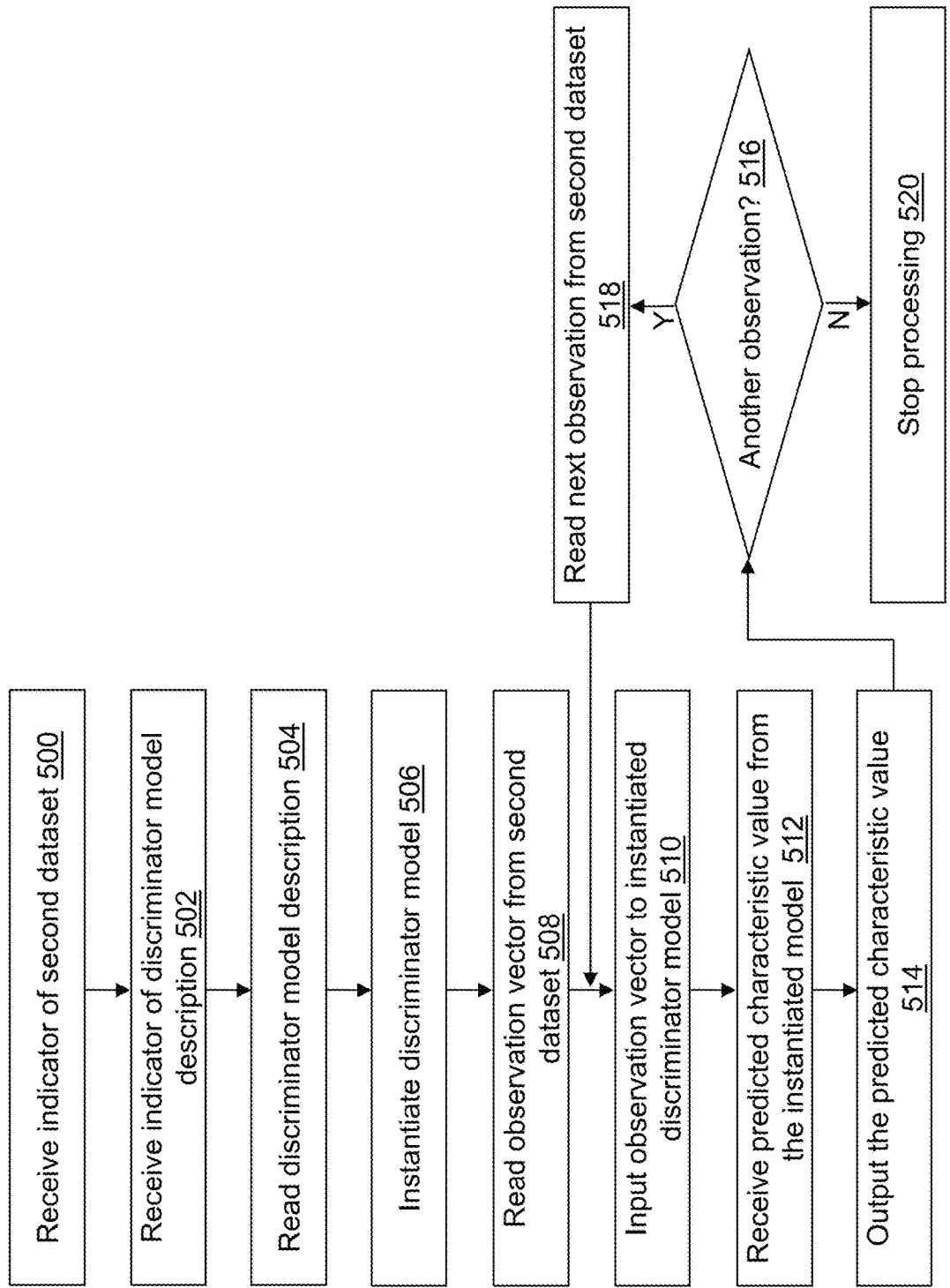
FIG. 5 depicts a flow diagram illustrating examples of operations performed by the prediction device of FIG. 4 in determining a classification in accordance with an illustrative embodiment.

Referring to FIG. 5, example operations of prediction application 422 are described to classify new data. Additional, fewer, or different operations may be performed depending on the embodiment of prediction application 422. The order of presentation of the operations of FIG. 5 is not intended to be limiting. Although some of the operational flows are presented in sequence, the various operations may be performed in various repetitions, concurrently (in parallel, for example, using threads and/or distributed computing system 428), and/or in other orders than those that are illustrated.

In an operation 500, a seventeenth indicator may be received that indicates second dataset 424. For example, the seventeenth indicator indicates a location and a name of second dataset 424. As an example, the seventeenth indicator may be received by prediction application 422 after selection from a user interface window or after entry by a user into a user interface window. In an alternative embodiment, second dataset 424 may not be selectable. For example, a most recently created dataset may be used automatically.

In an operation 502, an eighteenth indicator may be received that indicates discriminator model description 128. For example, the eighteenth indicator indicates a location and a name of discriminator model description 128. As an example, the eighteenth indicator may be received by prediction application 422 after selection from a user interface window or after entry by a user into a user interface window. In an alternative embodiment, discriminator model description 128 may not be selectable. For example, a most recently created model configuration data may be used automatically. As another example, discriminator model description 128 may be provided automatically as part of integration with classification application 122.

In an operation 504, a discriminator model description is read from discriminator model description 128.

In an operation 506, a discriminator model is instantiated with the discriminator model description. For example, the architecture of the neural network model, its hyperparameters, its weight vector, and other characterizing elements are read and used to instantiate a neural network model based on the information output from the training process in operation 262.

In an operation 508, an observation vector is read from second dataset 424.

In an operation 510, the observation vector is input to the instantiated model.

In an operation 512, a predicted characteristic value for the read observation vector is received as an output of the instantiated model. The output may include a probability that the observation vector has one or more different possible characteristic values. For example, the predicted characteristic value may be a class assigned to the read observation vector. The possible class values may be associated with the label set Q and may include an optional class value of c+1 that indicates that the read observation vector is a fake observation vector. The label set Q may be stored discriminator model description 128 or in a file indicated in discriminator model description 128 or may be otherwise provided as an input to prediction application 422.

In an operation 514, the predicted characteristic value may be output, for example, by storing the predicted characteristic value with the observation vector to predicted dataset 426. In addition, or in the alternative, the predicted characteristic value may be presented on second display 416, printed on second printer 420, sent to another computing device using second communication interface 406, an alarm or other alert signal may be sounded through second speaker 418, etc.

In an operation 516, a determination is made concerning whether second dataset 424 includes another observation vector. When second dataset 424 includes another observation vector, processing continues in an operation 518. When second dataset 424 does not include another observation vector, processing continues in an operation 520.

In operation 518, a next observation vector is read from second dataset 424, and processing continues in operation 510.

In operation 520, processing stops.

Figure 6:
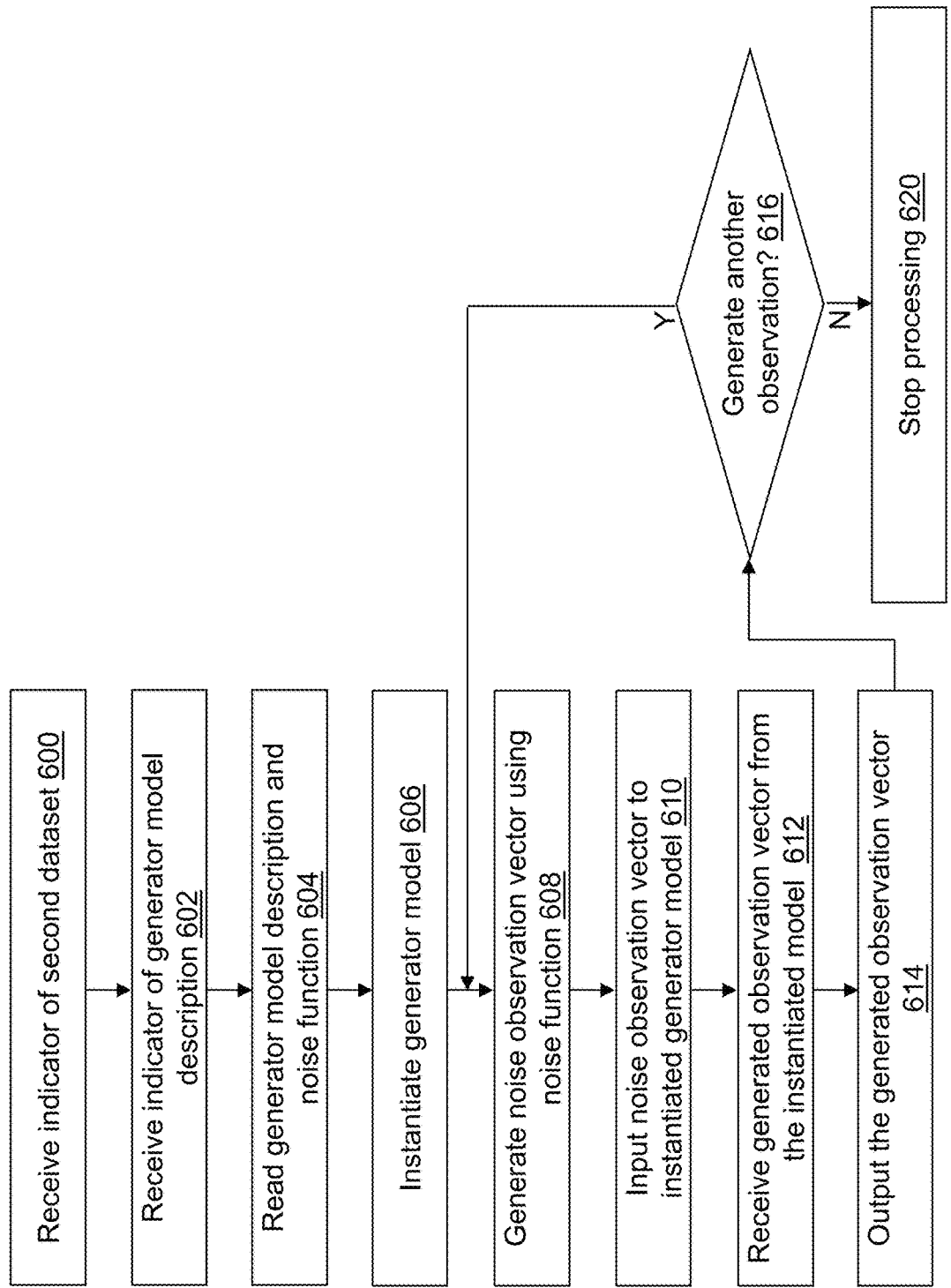
FIG. 6 depicts a flow diagram illustrating examples of operations performed by the prediction device of FIG. 4 in generating a fake observation vector in accordance with an illustrative embodiment.

Referring to FIG. 6, example operations of prediction application 422 are described to generate new observation vectors. Additional, fewer, or different operations may be performed depending on the embodiment of prediction application 422. The order of presentation of the operations of FIG. 6 is not intended to be limiting. Although some of the operational flows are presented in sequence, the various operations may be performed in various repetitions, concurrently (in parallel, for example, using threads and/or distributed computing system 428), and/or in other orders than those that are illustrated.

Similar to operation 500, in an operation 600, a seventeenth indicator may be received that indicates second dataset 424.

In an operation 602, a nineteenth indicator may be received that indicates generator model description 130. For example, the nineteenth indicator indicates a location and a name of generator model description 130. As an example, the nineteenth indicator may be received by prediction application 422 after selection from a user interface window or after entry by a user into a user interface window. In an alternative embodiment, generator model description 130 may not be selectable. For example, a most recently created model configuration data may be used automatically. As another example, generator model description 130 may be provided automatically as part of integration with classification application 122.

In an operation 604, a generator model description and the noise function may be read from generator model description 130.

In an operation 606, a generator model is instantiated with the generator model description. For example, the architecture of the neural network model, its hyperparameters, its weight vector, and other characterizing elements are read and used to instantiate a neural network model based on the information output from the training process in operation 262.

In an operation 608, a noise observation vector is generated using the noise function.

In an operation 610, the generated noise observation vector is input to the instantiated model.

In an operation 612, a fake observation vector generated from the generated noise observation vector is received as an output of the instantiated generator model.

In an operation 614, the fake observation vector may be output, for example, by storing the fake observation vector to second fake output data 428. In addition, or in the alternative, the fake observation vector may be presented on second display 416, printed on second printer 420, sent to another computing device using second communication interface 406, etc.

In an operation 616, a determination is made concerning whether another fake observation vector is to be generated. When another fake observation vector is to be generated, processing continues in operation 608. When another fake observation vector is to be generated, processing continues in an operation 618.

In operation 618, processing stops.

The operations of classification application 122 and prediction application 422 can be executed in parallel to speed up the training process, the classifying process, and/or the fake observation creation process. Classification application 122 may be executed in a synchronous mode that distributes the gradient computations across a plurality of worker computing devices. Each worker computing device computes the gradient for a portion of input classified data 124 and input unclassified data 126 that resides on that worker computing device, and the computed gradients are aggregated on a controller computing device. The weights are updated with the computed gradients and are sent to each worker computing device so that the processing for the next iteration can proceed with the updated weights.

Figure 7:
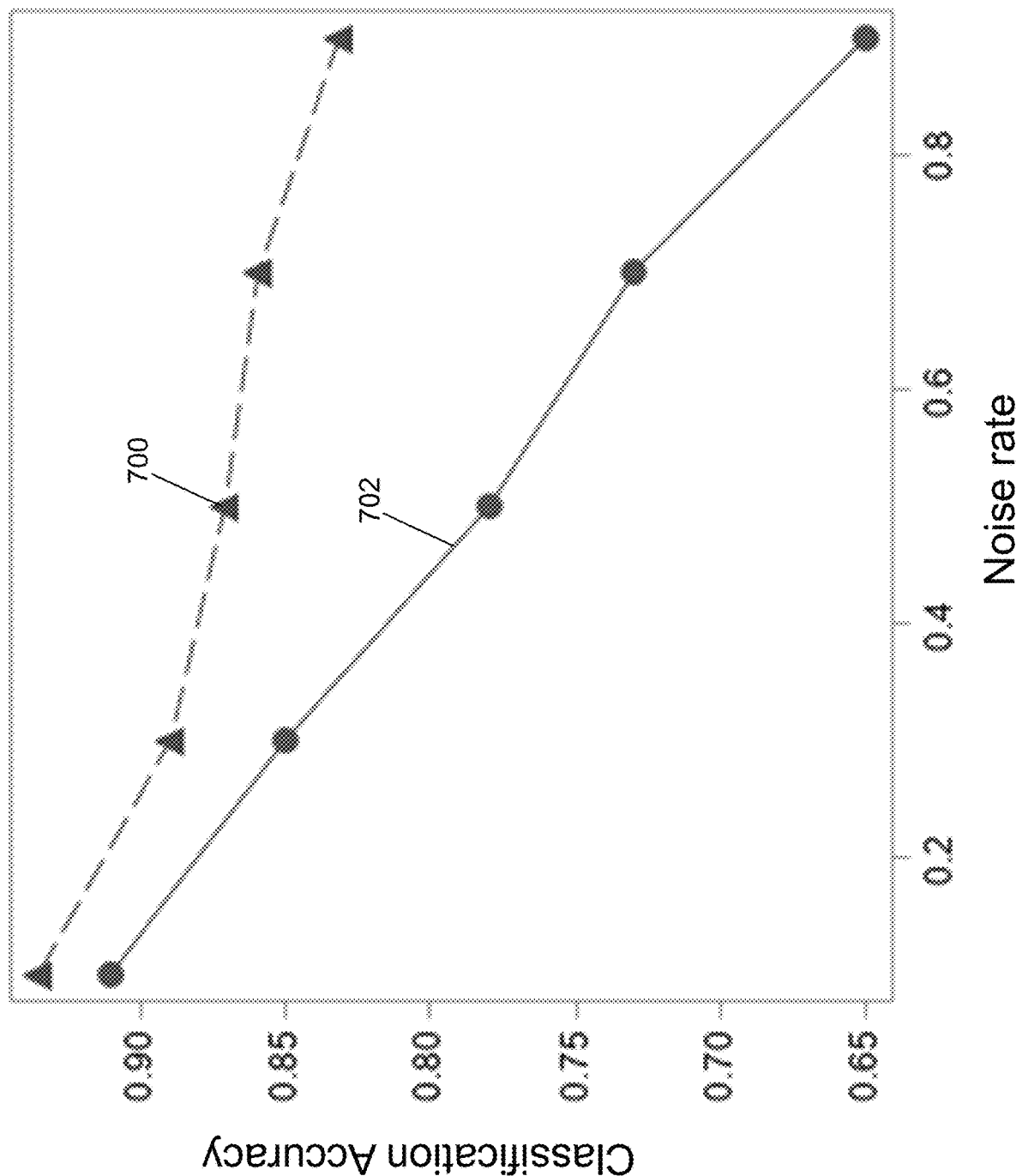
FIG. 7 shows an accuracy comparison generated as a result of training a classification model using the classification device of FIG. 1 relative to that of an existing classification method.

A performance of classification application 122 was evaluated. The dataset used was the CIFAR-10 dataset that included 60,000 images where each image is of the size 32 by 32 pixels. For the network architecture, the deep-convolutional GANs described in a paper by A. Radford et al. titled *Unsupervised Representation Learning With Deep Convolutional Generative Adversarial Networks* ICLR (2016) were used. Referring to FIG. 7, a classification accuracy is shown that was generated as a result of training a discriminator model using classification device 100 and is compared to the classification accuracy generated as a result of training using an existing classification method. The existing classification method is based on a deep convolutional GAN (DCGAN) published by TensorFlow as a tutorial. The accuracy is computed based on a classifier trained with generated images and evaluated on real images. A first training accuracy curve 700 shows the accuracy as a function of a noise rate computed using classification device 100. As the noise rate increases from 20% to 90%, classification device 100 maintains its classification accuracy. A second training accuracy curve 702 shows the accuracy as a function of a noise rate computed using the existing classification method. Using the existing classification method, the accuracy drops precipitously with increasing noise rate.

Figure 8:
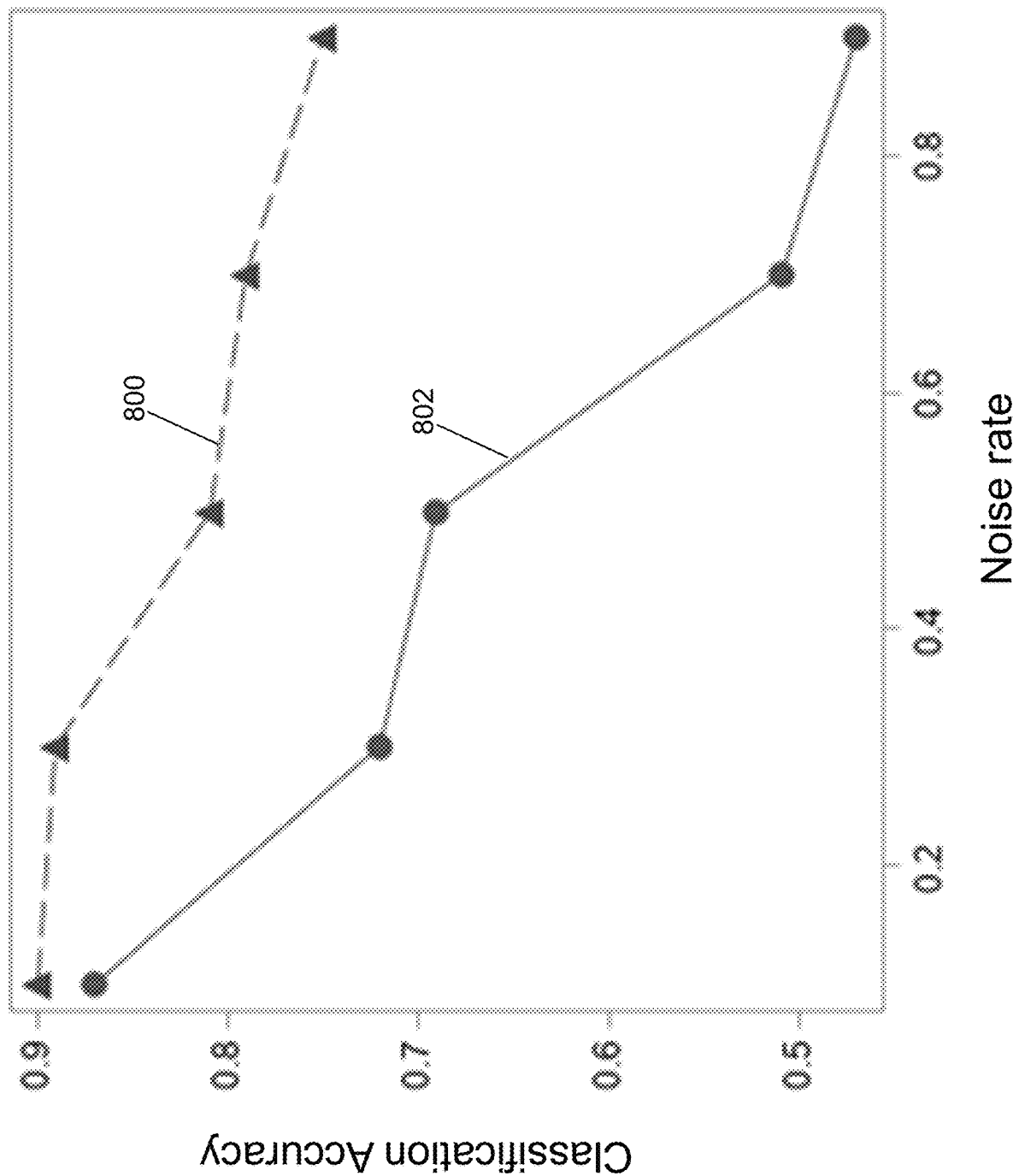
FIG. 8 shows an accuracy comparison generated as a result of testing a classification model using the classification device of FIG. 1 relative to that of the existing classification method.

Referring to FIG. 8, the accuracy is computed based on a classifier trained with real images and evaluated on generated images. A first testing accuracy curve 800 shows the accuracy as a function of the noise rate computed using classification device 100. As the noise rate increases from 20% to 90%, classification device 100 maintains its classification accuracy. A second testing accuracy curve 802 shows the accuracy as a function of the noise rate computed using the existing classification method. Using the existing classification method, the accuracy again drops precipitously with increasing noise rate. The performance margin in terms of accuracy using classification device 100 increases as the noise rate increases demonstrating a robustness of classification application 122.

Referring to Table 1 below, a FID comparison between the existing classification method and classification application 122 with respect to different noise rates, where FID measures a distances between the probability distributions of the real and the generated images by modeling them using a multivariate Gaussian distribution to capture the quality of the generated images. A smaller FID indicates better diversity of the generator model and better performance.

TABLE 1

| Noise rate | Existing classification method | Classification application 122 |
|---|---|---|
| 0.2 | 45.3 | 37.3 |
| 0.4 | 57.2 | 43.2 |
| 0.6 | 71.6 | 47.6 |
| 0.8 | 77.3 | 51.5 |

Classification application 122 achieved a much better FID value for all noise rates. The improvement further increased with increasing noise rate again demonstrating the robustness of classification application 122

There are applications for classification application 122 and/or prediction application 422 in many areas such as process control and equipment health monitoring, image processing and classification, video gaming, virtual reality, film industry, data segmentation, data analysis, etc. The presented results demonstrate improved model accuracies.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
generate a first batch of noise observation vectors using a predefined noise function, wherein the first batch of noise observation vectors includes a predefined number of observation vectors;
(A) select a first batch of unclassified observation vectors from a plurality of unclassified observation vectors, wherein the first batch of unclassified observation vectors includes the predefined number of observation vectors;
(B) select a first batch of classified observation vectors from a plurality of classified observation vectors, wherein a target variable value is defined to represent a class for each respective observation vector of the plurality of classified observation vectors, wherein the first batch of classified observation vectors includes the predefined number of observation vectors;
(C) update a discriminator neural network model with a plurality of observation vectors, wherein the plurality of observation vectors includes the first batch of unclassified observation vectors, the first batch of classified observation vectors, and the first batch of noise observation vectors, wherein the discriminator neural network model is trained to classify the plurality of unclassified observation vectors and the first batch of noise observation vectors;
(D) compute a discriminator loss value that includes an adversarial loss term, wherein the adversarial loss term is computed using a predefined transition matrix;
(E) select a second batch of unclassified observation vectors from the plurality of unclassified observation vectors, wherein the second batch of unclassified observation vectors includes the predefined number of observation vectors;
(F) generate a second batch of noise observation vectors using the predefined noise function, wherein the second batch of noise observation vectors includes the predefined number of observation vectors;
(G) update a generator neural network model with a second plurality of observation vectors, wherein the second plurality of observation vectors includes the second batch of unclassified observation vectors and the second batch of noise observation vectors, wherein the generator neural network model is trained to generate a fake observation vector for each observation vector included in the second batch of noise observation vectors;
(H) repeat (E) to (G) a predetermined number of times;
(I) compute a generator loss value;
(J) repeat (A) to (I) until a convergence parameter value indicates the computed discriminator loss value and the computed generator loss value have converged or a predetermined maximum number of iterations of (A) is performed, wherein the first batch of noise observation vectors is replaced with the fake observation vector generated for each observation vector included in the second batch of noise observation vectors in (G);
determine the target variable value for each observation vector of the plurality of unclassified observation vectors based on an output of the updated discriminator model; and
output the target variable value for each observation vector of the plurality of unclassified observation vectors, wherein the target variable value selected for each observation vector of the plurality of unclassified observation vectors identifies the class of a respective observation vector.

2. The non-transitory computer-readable medium of claim 1, wherein before (A), the computer-readable instructions further cause the computing device to:
define cluster centers for the plurality of unclassified observation vectors using a clustering algorithm, wherein a number of the cluster centers is a number of unique values of the target variable value of the plurality of classified observation vectors;
define class centers for the plurality of classified observation vectors using the clustering algorithm, wherein a number of the class centers is the number of unique values of the target variable value;
determine a unique class for each cluster of the defined cluster centers, wherein the unique class is selected from a plurality of classes that each represent a unique value of the target variable value of the plurality of classified observation vectors;
(K) select a next classified observation vector from the plurality of classified observation vectors;
(L) compute a distance value between the selected next classified observation vector and each cluster center of the defined cluster centers;
(M) when the target variable value of the selected next classified observation vector is not the unique class determined for a cluster center having a minimum computed distance value,
select a first distance value as the minimum computed distance value;
select a second distance value as the computed distance value to the cluster center having the unique class of the target variable value of the selected next classified observation vector;
compute a ratio value between the selected second distance value and the selected first distance value; and
change the target variable value of the selected next classified observation vector to the unique class determined for the cluster center having the minimum computed distance value when the computed ratio value satisfies a predefined label correction threshold;

(N) repeat (K) through (M) until each observation vector of the plurality of classified observation vectors is selected in (K), wherein the target variable value selected for each observation vector of the plurality of observation vectors is defined to represent the label for a respective observation vector.

3. The non-transitory computer-readable medium of claim 2, wherein the clustering algorithm is a k-means clustering algorithm.

4. The non-transitory computer-readable medium of claim 2, wherein the distance value is a Euclidian distance.

5. The non-transitory computer-readable medium of claim 2, wherein the ratio value is computed using $$r_v = \frac{e^{-d_1}}{\sum_{j=1}^{2} e^{-d_j}},$$

where $r_v$ is the ratio value, $d_1$ is the selected first distance value, and $d_2$ is the selected second distance value.

6. The non-transitory computer-readable medium of claim 5, wherein the computed ratio value satisfies the predefined label correction threshold when the computed ratio value is greater than the predefined label correction threshold.

7. The non-transitory computer-readable medium of claim 2, wherein defining the cluster centers comprises:

executing the clustering algorithm to assign each observation vector of the plurality of unclassified observation vectors to a cluster of the number of the cluster centers; and computing an average of each observation vector assigned to a common cluster to define a cluster center for the common cluster.

8. The non-transitory computer-readable medium of claim 7, wherein defining the class centers comprises:

computing an average of each observation vector of the plurality of classified observation vectors having a common unique value of the target variable value to define a class center for each unique value of the target variable value.

9. The non-transitory computer-readable medium of claim 8, wherein determining the unique class for each cluster of the defined cluster centers comprises:

computing a cluster distance value between each cluster center of the defined cluster centers and each class center of the defined class centers to define cluster distance values for each respective cluster center;

wherein the unique class determined for each cluster center of the defined cluster centers is the unique value of the target variable value associated with the class center that has a minimum value of the cluster distance value defined for each respective cluster center.

10. The non-transitory computer-readable medium of claim 9, wherein the computed cluster distance value is a Euclidian distance.

11. The non-transitory computer-readable medium of claim 2, wherein the adversarial loss term is computed using $L_{adv,d} = E_{(x^r,\tilde{y}) \sim p^r(x,\tilde{y})} [-\log(\Sigma_{\hat{y}^r} T_{\tilde{y}^r \hat{y}^r} \hat{C}(\hat{y}=y^r|\hat{x}^r))]$, where $L_{adv,d}$ is the adversarial loss term, $T$ is the predefined transition matrix, $E_{(x^r,\tilde{y}) \sim p^r(x,\tilde{y})}$ indicates an expectation computed based on a probability distribution of the plurality of classified observation vectors, $(x^r,\tilde{y})$ indicates the observation vectors of the plurality of classified observation vectors with their associated target variable value after (N), $(x,\tilde{y})$ indicates the observation vectors of the plurality of classified observation vectors with their associated target variable value before (K), $p^r(x,\tilde{y})$ indicates a joint distribution of the plurality of classified observation vectors after (N), $\tilde{x}, \hat{y}^r$ indicates a corrected target variable value after (N), $\hat{y}^r$ indicates the target variable value before (K), $\hat{x}^r$ indicates the observation vectors of the plurality of classified observation vectors for which their associated target variable value was changed in (M), and $\hat{C}(\hat{y}=y^r|\hat{x}^r)$ indicates a conditional probability that a class $\hat{y}$ is classified as $y^r$ given the observation vector $\hat{x}^r$.

12. The non-transitory computer-readable medium of claim 11, wherein the discriminator loss value is computed using $L_d = L_{pt,d} + L_{adv,d} + \lambda_1 L_{un}$, where $L_d$ indicates the discriminator loss value, $L_{pt,d}$ indicates a pull away loss term, $L_{un}$ indicates an unclassified loss term, and $\lambda_1$ indicates a predefined discriminator regularization parameter value.

13. The non-transitory computer-readable medium of claim 1, wherein the target variable value for each generated fake observation vector is further output.

14. The non-transitory computer-readable medium of claim 13, wherein the target variable value for each generated fake observation vector is selected from a plurality of classes that each represent a unique value of the target variable value of the plurality of classified observation vectors and a fake class that indicates that the generated fake observation vector is a fake.

15. The non-transitory computer-readable medium of claim 1, wherein the target variable value determined for each observation vector of the plurality of unclassified observation vectors is selected from a plurality of classes that each represent a unique value of the target variable value of the plurality of classified observation vectors and a fake class that indicates that a respective observation vector is a fake.

16. The non-transitory computer-readable medium of claim 1, wherein each generated fake observation vector is further output.

17. The non-transitory computer-readable medium of claim 1, wherein the updated discriminator neural network model is further output.

18. The non-transitory computer-readable medium of claim 1, wherein after (J), the computer-readable instructions further cause the computing device to:

read a new observation vector from a dataset;

input the read new observation vector to the updated discriminator neural network model to predict a class for the read new observation vector; and output the predicted class.

19. The non-transitory computer-readable medium of claim 1, wherein the updated generator neural network model is further output.

20. The non-transitory computer-readable medium of claim 1, wherein after (J), the computer-readable instructions further cause the computing device to:

generate a new noise observation vector using the predefined noise function;

input the generated new noise observation vector to the updated neural network generator model to generate a new fake observation vector; and output the generated new fake observation vector.

21. The non-transitory computer-readable medium of claim 1, wherein the computed discriminator loss value and the computed generator loss value have converged when a sum of the computed discriminator loss value and the computed generator loss value is less than or equal to a predefined convergence threshold value.

22. The non-transitory computer-readable medium of claim 1, wherein the generator loss value is computed using $L_g = L_{fm} + \lambda_2 L_{pt,g} + \lambda_3 L_{adv,g}$, where $L_g$ indicates the generator loss value, $L_{fm}$ is a feature matching loss term, $L_{pt,g}$ is a pull away loss term, $L_{adv,g}$ is an adversarial loss term for the generator model, $\lambda_2$ indicates a first predefined discriminator regularization parameter value, and $\lambda_3$ indicates a second predefined discriminator regularization parameter value.

23. The non-transitory computer-readable medium of claim 1, wherein the target variable value for each generated noise observation vector of the first batch of noise observation vectors and of the second batch of noise observation vectors is defined as y=c+1, where y indicates the target variable value, and c indicates a number of unique values of the target variable value of the plurality of classified observation vectors.

24. A computing device comprising:
a processor; and
a non-transitory computer-readable medium operably coupled to the processor, the computer-readable medium having computer-readable instructions stored thereon that, when executed by the processor, cause the computing device to
generate a first batch of noise observation vectors using a predefined noise function, wherein the first batch of noise observation vectors includes a predefined number of observation vectors;
(A) select a first batch of unclassified observation vectors from a plurality of unclassified observation vectors, wherein the first batch of unclassified observation vectors includes the predefined number of observation vectors;
(B) select a first batch of classified observation vectors from a plurality of classified observation vectors, wherein a target variable value is defined to represent a class for each respective observation vector of the plurality of classified observation vectors, wherein the first batch of classified observation vectors includes the predefined number of observation vectors;
(C) update a discriminator neural network model with a plurality of observation vectors, wherein the plurality of observation vectors includes the first batch of unclassified observation vectors, the first batch of classified observation vectors, and the first batch of noise observation vectors, wherein the discriminator neural network model is trained to classify the plurality of unclassified observation vectors and the first batch of noise observation vectors;
(D) compute a discriminator loss value that includes an adversarial loss term, wherein the adversarial loss term is computed using a predefined transition matrix;
(E) select a second batch of unclassified observation vectors from the plurality of unclassified observation vectors, wherein the second batch of unclassified observation vectors includes the predefined number of observation vectors;
(F) generate a second batch of noise observation vectors using the predefined noise function, wherein the second batch of noise observation vectors includes the predefined number of observation vectors;
(G) update a generator neural network model with a second plurality of observation vectors, wherein the second plurality of observation vectors includes the second batch of unclassified observation vectors and the second batch of noise observation vectors, wherein the generator neural network model is trained to generate a fake observation vector for each observation vector included in the second batch of noise observation vectors;
(H) repeat (E) to (G) a predetermined number of times;
(I) compute a generator loss value;
(J) repeat (A) to (I) until a convergence parameter value indicates the computed discriminator loss value and the computed generator loss value have converged or a predetermined maximum number of iterations of (A) is performed, wherein the first batch of noise observation vectors is replaced with the fake observation vector generated for each observation vector included in the second batch of noise observation vectors in (G);
determine the target variable value for each observation vector of the plurality of unclassified observation vectors based on an output of the updated discriminator model; and
output the target variable value for each observation vector of the plurality of unclassified observation vectors, wherein the target variable value selected for each observation vector of the plurality of unclassified observation vectors identifies the class of a respective observation vector.

25. A method of predicting occurrence of an event or classifying an object using semi-supervised data to label unclassified data, the method comprising:
generating, by a computing device, a first batch of noise observation vectors using a predefined noise function, wherein the first batch of noise observation vectors includes a predefined number of observation vectors;
(A) selecting, by the computing device, a first batch of unclassified observation vectors from a plurality of unclassified observation vectors, wherein the first batch of unclassified observation vectors includes the predefined number of observation vectors;
(B) selecting, by the computing device, a first batch of classified observation vectors from a plurality of classified observation vectors, wherein a target variable value is defined to represent a class for each respective observation vector of the plurality of classified observation vectors, wherein the first batch of classified observation vectors includes the predefined number of observation vectors;
(C) updating, by the computing device, a discriminator neural network model with a plurality of observation vectors, wherein the plurality of observation vectors includes the first batch of unclassified observation vectors, the first batch of classified observation vectors, and the first batch of noise observation vectors, wherein the discriminator neural network model is trained to classify the plurality of unclassified observation vectors and the first batch of noise observation vectors;
(D) computing, by the computing device, a discriminator loss value that includes an adversarial loss term, wherein the adversarial loss term is computed using a predefined transition matrix;
(E) selecting, by the computing device, a second batch of unclassified observation vectors from the plurality of unclassified observation vectors, wherein the second batch of unclassified observation vectors includes the predefined number of observation vectors;
(F) generating, by the computing device, a second batch of noise observation vectors using the predefined noise function, wherein the second batch of noise observation vectors includes the predefined number of observation vectors;

(G) updating, by the computing device, a generator neural network model with a second plurality of observation vectors, wherein the second plurality of observation vectors includes the second batch of unclassified observation vectors and the second batch of noise observation vectors, wherein the generator neural network model is trained to generate a fake observation vector for each observation vector included in the second batch of noise observation vectors;

(H) repeating, by the computing device, (E) to (G) a predetermined number of times;

(I) computing, by the computing device, a generator loss value;

(J) repeating, by the computing device, (A) to (I) until a convergence parameter value indicates the computed discriminator loss value and the computed generator loss value have converged or a predetermined maximum number of iterations of (A) is performed, wherein the first batch of noise observation vectors is replaced with the fake observation vector generated for each observation vector included in the second batch of noise observation vectors in (G);

determining, by the computing device, the target variable value for each observation vector of the plurality of unclassified observation vectors based on an output of the updated discriminator model; and outputting, by the computing device, the target variable value for each observation vector of the plurality of unclassified observation vectors, wherein the target variable value selected for each observation vector of the plurality of unclassified observation vectors identifies the class of a respective observation vector.

26. The method of claim 25, further comprising before (A):

defining, by the computing device, cluster centers for the plurality of unclassified observation vectors using a clustering algorithm, wherein a number of the cluster centers is a number of unique values of the target variable value of the plurality of classified observation vectors;

defining, by the computing device, class centers for the plurality of classified observation vectors using the clustering algorithm, wherein a number of the class centers is the number of unique values of the target variable value;

determining, by the computing device, a unique class for each cluster of the defined cluster centers, wherein the unique class is selected from a plurality of classes that each represent a unique value of the target variable value of the plurality of classified observation vectors;

(K) selecting, by the computing device, a next classified observation vector from the plurality of classified observation vectors;

(L) computing, by the computing device, a distance value between the selected next classified observation vector and each cluster center of the defined cluster centers;

(M) when the target variable value of the selected next classified observation vector is not the unique class determined for a cluster center having a minimum computed distance value, selecting, by the computing device, a first distance value as the minimum computed distance value;

selecting, by the computing device, a second distance value as the computed distance value to the cluster center having the unique class of the target variable value of the selected next classified observation vector;

computing, by the computing device, a ratio value between the selected second distance value and the selected first distance value; and changing, by the computing device, the target variable value of the selected next classified observation vector to the unique class determined for the cluster center having the minimum computed distance value when the computed ratio value satisfies a predefined label correction threshold;

(N) repeating, by the computing device, (K) through (M) until each observation vector of the plurality of classified observation vectors is selected in (K), wherein the target variable value selected for each observation vector of the plurality of observation vectors is defined to represent the label for a respective observation vector.

27. The method of claim 26, wherein defining the cluster centers comprises:

executing the clustering algorithm to assign each observation vector of the plurality of unclassified observation vectors to a cluster of the number of the cluster centers; and computing an average of each observation vector assigned to a common cluster to define a cluster center for the common cluster.

28. The method of claim 27, wherein defining the class centers comprises:

computing an average of each observation vector of the plurality of classified observation vectors having a common unique value of the target variable value to define a class center for each unique value of the target variable value.

29. The method of claim 28, wherein determining the unique class for each cluster of the defined cluster centers comprises:

computing a cluster distance value between each cluster center of the defined cluster centers and each class center of the defined class centers to define cluster distance values for each respective cluster center;

wherein the unique class determined for each cluster center of the defined cluster centers is the unique value of the target variable value associated with the class center that has a minimum value of the cluster distance value defined for each respective cluster center.

30. The method of claim 26, wherein the adversarial loss term is computed using $L_{adv,d} = E_{(x^r,\tilde{y}) \sim p^r(x,\tilde{y})} [-\log(\Sigma_{\hat{y}^r} T_{\hat{y}^r \tilde{y}^r} \hat{C}(\hat{y}=y^r|\hat{x}^r))]$, where $L_{adv,d}$ is the adversarial loss term, T is the predefined transition matrix, $E_{(x^r,\tilde{y}) \sim p^r(x,\tilde{y})}$ indicates an expectation computed based on a probability distribution of the plurality of classified observation vectors, $(x^r,\tilde{y})$ indicates the observation vectors of the plurality of classified observation vectors with their associated target variable value after (N), $(x,\tilde{y})$ indicates the observation vectors of the plurality of classified observation vectors with their associated target variable value before (K), $p^r(x,\tilde{y})$ indicates a joint distribution of the plurality of classified observation vectors after (N), $\tilde{x}$, $\hat{y}^r$ indicates a corrected target variable value after (N), $\hat{y}^r$ indicates the target variable value before (K), $\hat{x}^r$ indicates the observation vectors of the plurality of classified observation vectors for which their associated target variable value was changed in (M), and $\hat{C}(\hat{y}=y^r|\hat{x}^r)$ indicates a conditional probability that a class $\hat{y}$ is classified as $y^r$ given the observation vector $\hat{x}^r$.

* * * * *

UNITED STATES PATENT AND TRADEMARK OFFICE
CERTIFICATE OF CORRECTION

PATENT NO. : 11,087,215 B1
APPLICATION NO. : 17/224708
DATED : August 10, 2021
INVENTOR(S) : Xu Chen It is certified that error appears in the above-identified patent and that said Letters Patent is hereby corrected as shown below:

In the Specification

Column 16, Lines 64-65:
Delete the phrase "$\tau$ indicates a transpose," and replace with --T indicates a transpose,--.

Column 17, Line 28:
Delete the phrase "$\hat{C}(\hat{y} = \hat{x}^r)$" and replace with --$\hat{C}(\hat{y} = y^r | \hat{x}^r)$--.

Column 17, Line 40:
Delete the phrase "$(c + 1)$th" and replace with --$(c + 1)^{th}$--.

Column 18, Line 10:
Delete the phrase "$L_g = L_{fm} + \lambda_2 L_{pt,g} +$ where $L_{fm}$" and replace with
--$L_g = L_{fm} + \lambda_2 L_{pt,g} + \lambda_3 L_{adv,g}$, where $L_{fm}$--.

Column 18, Line 35:
Delete the phrase "$\| \quad \|_2^2$" and replace with --$\| \quad \|_2^2$--.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*